(12) United States Patent
Hurren et al.

(10) Patent No.: US 8,302,108 B1
(45) Date of Patent: Oct. 30, 2012

(54) FEATURE BASED SOFTWARE VIRTUALIZATION

(75) Inventors: Jeremy Hurren, Pleasant Grove, UT (US); Randall R. Cook, Springville, UT (US)

(73) Assignee: Symantec Corporation, Mountain View, CA (US)

( * ) Notice: Subject to any disclaimer, the term of this patent is extended or adjusted under 35 U.S.C. 154(b) by 1140 days.

(21) Appl. No.: 11/960,706

(22) Filed: Dec. 20, 2007

Related U.S. Application Data

(63) Continuation-in-part of application No. 11/026,520, filed on Dec. 30, 2004, now Pat. No. 7,620,956, which is a continuation-in-part of application No. 10/459,936, filed on Jun. 11, 2003, now Pat. No. 7,117,495, application No. 11/960,706, which is a continuation-in-part of application No. 11/027,489, filed on Dec. 30, 2004, now Pat. No. 7,496,931, and a continuation-in-part of application No. 11/081,856, filed on Mar. 16, 2005, now Pat. No. 7,512,977, which is a continuation-in-part of application No. 10/459,936, application No. 11/960,706, which is a continuation-in-part of application No. 11/082,194, filed on Mar. 16, 2005, now Pat. No. 7,549,164, which is a continuation-in-part of application No. 10/459,936, application No. 11/960,706, which is a continuation-in-part of application No. 11/324,565, filed on Jan. 3, 2006, now Pat. No. 7,886,291, which is a continuation-in-part of application No. 10/459,936, said application No. 11/324,565 is a continuation-in-part of application No. 10/459,870, (Continued)

(51) Int. Cl.
G06F 3/00 (2006.01)
G06F 9/44 (2006.01)
G06F 9/46 (2006.01)
G06F 13/00 (2006.01)

(52) U.S. Cl. .................. 719/320; 709/226; 717/174
(58) Field of Classification Search ............... 705/1, 26; 709/227
See application file for complete search history.

(56) References Cited

U.S. PATENT DOCUMENTS 7,117,495 B2   10/2006   Blaser et al.

(Continued)

OTHER PUBLICATIONS

Altiris, Altiris Software Virtualization Solution 2.0—White Paper, Altiris Inc, 2006, pp. 1-15.*

(Continued)

*Primary Examiner* — Diem Cao
(74) *Attorney, Agent, or Firm* — Advantedge Law Group

(57) ABSTRACT

The disclosure is directed to feature based software virtualization. In one example, a first virtual sub-layer associated with a first feature set of a software package is virtually installed to a computing device. The first feature set includes a first subset of features associated with the software package. The first virtual sub-layer is enabled to activate the first feature set. A second virtual sub-layer associated with a second feature set of the software package is virtually installed to the computing device. The second feature set includes a second subset of the features associated with the software package. The second virtual sub-layer is enabled to activate the second feature set. In certain embodiments, a first fee is charged for the first feature set and a second fee is charged for the second feature set.

19 Claims, 12 Drawing Sheets

Related U.S. Application Data filed on Jun. 11, 2003, now Pat. No. 7,165,260, and a continuation-in-part of application No. 11/026,520, which is a continuation-in-part of application No. 10/459,936, said application No. 11/324,565 is a continuation-in-part of application No. 11/027,489, and a continuation-in-part of application No. 11/081,856, which is a continuation-in-part of application No. 10/459,936, said application No. 11/324,565 is a continuation-in-part of application No. 11/082,194, which is a continuation-in-part of application No. 10/459,936, application No. 11/960,706, which is a continuation-in-part of application No. 11/324,571, which is a continuation-in-part of application No. 10/459,936, said application No. 11/324,571 is a continuation-in-part of application No. 10/459,768, filed on Jun. 11, 2003, now Pat. No. 7,162,724, said application No. 11/324,571 is a continuation-in-part of application No. 10/459,870, said application No. 11/324,571 is a continuation-in-part of application No. 11/026,520, said application No. 11/324,571 is a continuation-in-part of application No. 10/459,936, said application No. 11/324,571 is a continuation-in-part of application No. 11/027,489, application No. 11/960,706, which is a continuation-in-part of application No. 11/081,856, which is a continuation-in-part of application No. 10/459,936, application No. 11/960,706, which is a continuation-in-part of application No. 11/082,194, which is a continuation-in-part of application No. 10/459,936, application No. 11/960,706, which is a continuation-in-part of application No. 11/324,375, filed on Jan. 3, 2006, now Pat. No. 8,010,961, which is a continuation-in-part of application No. 10/459,936, application No. 11/960,706, which is a continuation-in-part of application No. 10/459,768, said application No. 11/324,375 is a continuation-in-part of application No. 10/459,870, said application No. 11/324,375 is a continuation-in-part of application No. 11/026,520, which is a continuation-in-part of application No. 10/459,936, said application No. 11/324,375 is a continuation-in-part of application No. 11/027,489, said application No. 11/324,375 is a continuation-in-part of application No. 11/081,856, which is a continuation-in-part of application No. 10/459,936, application No. 11/960,706, which is a continuation-in-part of application No. 11/324,607, filed on Jan. 3, 2006, now Pat. No. 7,461,096, said application No. 11/082,194 is a continuation-in-part of application No. 10/459,936, said application No. 11/324,607 is a continuation-in-part of application No. 10/459,870, said application No. 11/324,607 is a continuation-in-part of application No. 11/026,520, and a continuation-in-part of application No. 10/459,936, said application No. 11/324,607 is a continuation-in-part of application No. 11/027,489, said application No. 11/324,607 is a continuation-in-part of application No. 11/081,856, which is a continuation-in-part of application No. 10/459,936, application No. 11/960,706, which is a continuation-in-part of application No. 11/324,545, filed on Jan. 3, 2006, now Pat. No. 7,542,988, which is a continuation-in-part of application No. 10/459,936, said application No. 11/324,545 is a continuation-in-part of application No. 10/459,768, said application No. 11/324,545 is a continuation-in-part of application No. 10/459,936, said application No. 11/324,545 is a continuation-in-part of application No. 11/027,489, said application No. 11/324,545 is a continuation-in-part of application No. 11/081,856, which is a continuation-in-part of application No. 10/459,936, said application No. 11/324,545 is a continuation-in-part of application No. 11/082,194, which is a continuation-in-part of application No. 10/459,936, application No. 11/960,706, which is a continuation-in-part of application No. 11/324,572, filed on Jan. 3, 2006, now Pat. No. 7,877,413, which is a continuation-in-part of application No. 10/459,936, said application No. 11/324,572 is a continuation-in-part of application No. 10/459,768, said application No. 11/324,572 is a continuation-in-part of application No. 10/459,870, said application No. 11/324,572 is a continuation-in-part of application No. 11/026,520, which is a continuation-in-part of application No. 10/459,936, said application No. 11/324,572 is a continuation-in-part of application No. 11/081,856, which is a continuation-in-part of application No. 10/459,936, said application No. 11/324,572 is a continuation-in-part of application No. 11/082,194, which is a continuation-in-part of application No. 10/459,936, application No. 11/960,706, which is a continuation-in-part of application No. 11/324,573, filed on Jan. 3, 2006, now Pat. No. 7,461,086, which is a continuation-in-part of application No. 10/459,936, said application No. 11/324,573 is a continuation-in-part of application No. 10/459,768, said application No. 11/324,573 is a continuation-in-part of application No. 10/459,870, said application No. 11/324,573 is a continuation-in-part of application No. 11/026,520, said application No. 11/324,573 is a continuation-in-part of application No. 10/459,936, said application No. 11/324,573 is a continuation-in-part of application No. 11/027,489, said application No. 11/324,573 is a continuation-in-part of application No. 11/081,856, which is a continuation-in-part of application No. 10/459,936, said application No. 11/324,573 is a continuation-in-part of application No. 11/082,194, which is a continuation-in-part of application No. 10/459,936, application No. 11/960,706, which is a continuation-in-part of application No. 11/324,496, filed on Jan. 3, 2006, now Pat. No. 7,970,789, which is a continuation-in-part of application No. 10/459,936, said application No. 11/324,496 is a continuation-in-part of application No. 10/459,768, said application No. 11/324,496 is a continuation-in-part of application No. 10/459,870, said application No. 11/324,496 is a continuation-in-part of application No. 11/026,520, which is a continuation-in-part of application No. 10/459,936, said application No. 11/324,496 is a continuation-in-part of application No. 11/027,489, said application No. 11/324,496 is a continuation-in-part of application No. 11/081,856, which is a continuation-in-part of application No.

10/459,936, application No. 11/960,706, which is a continuation-in-part of application No. 11/528,858, filed on Sep. 28, 2006, now Pat. No. 7,945,897, and a continuation-in-part of application No. 10/459,936, and a continuation-in-part of application No. 10/459,768, and a continuation-in-part of application No. 10/459,870, said application No. 11/528,858 is a continuation-in-part of application No. 11/026,520, which is a continuation-in-part of application No. 10/459,936, said application No. 11/528,858 is a continuation-in-part of application No. 11/027,489, said application No. 11/528,858 is a continuation-in-part of application No. 11/081,856, which is a continuation-in-part of application No. 10/459,936, said application No. 11/528,858 is a continuation-in-part of application No. 11/082,194, which is a continuation-in-part of application No. 10/459,936, said application No. 11/528,858 is a continuation-in-part of application No. 11/324,565, which is a continuation-in-part of application No. 10/459,936, and a continuation-in-part of application No. 10/459,768, and a continuation-in-part of application No. 10/459,870, and a continuation-in-part of application No. 11/026,520, said application No. 11/082,194 is a continuation-in-part of application No. 10/459,936, said application No. 11/324,565 is a continuation-in-part of application No. 11/027,489, said application No. 11/324,565 is a continuation-in-part of application No. 11/081,856, which is a continuation-in-part of application No. 10/459,936, said application No. 11/324,565 is a continuation-in-part of application No. 11/082,194, which is a continuation-in-part of application No. 10/459,936, said application No. 11/528,858 is a continuation-in-part of application No. 11/324,571, which is a continuation-in-part of application No. 10/459,936, said application No. 11/324,571 is a continuation-in-part of application No. 10/459,768, and a continuation-in-part of application No. 10/459,870, and a continuation-in-part of application No. 11/026,520, which is a continuation-in-part of application No. 10/459,936, said application No. 11/324,571 is a continuation-in-part of application No. 11/027,489, said application No. 11/324,571 is a continuation-in-part of application No. 11/081,856, which is a continuation-in-part of application No. 10/459,936, said application No. 11/324,571 is a continuation-in-part of application No. 11/082,194, which is a continuation-in-part of application No. 10/459,936, said application No. 11/324,545 is a continuation-in-part of application No. 10/459,936, said application No. 11/528,858 is a continuation-in-part of application No. 11/324,375, which is a continuation-in-part of application No. 10/459,936, said application No. 11/324,375 is a continuation-in-part of application No. 10/459,768, said application No. 11/324,375 is a continuation-in-part of application No. 10/459,870, said application No. 11/324,375 is a continuation-in-part of application No. 11/026,520, which is a continuation-in-part of application No. 10/459,936, said application No. 11/324,375 is a continuation-in-part of application No. 11/027,489, said application No. 11/324,375 is a continuation-in-part of application No. 11/081,856, which is a continuation-in-part of application No. 10/459,936, said application No. 11/528,858 is a continuation-in-part of application No. 11/324,607, which is a continuation-in-part of application No. 10/459,936, said application No. 11/324,607 is a continuation-in-part of application No. 10/459,768, said application No. 11/324,607 is a continuation-in-part of application No. 10/459,870, said application No. 11/324,607 is a continuation-in-part of application No. 11/026,520, which is a continuation-in-part of application No. 10/459,936, said application No. 11/324,607 is a continuation-in-part of application No. 11/027,489, said application No. 11/324,607 is a continuation-in-part of application No. 11/081,856, which is a continuation-in-part of application No. 10/459,936, said application No. 11/324,607 is a continuation-in-part of application No. 11/082,194, which is a continuation-in-part of application No. 10/459,936, said application No. 11/528,858 is a continuation-in-part of application No. 11/324,545, which is a continuation-in-part of application No. 10/459,936, said application No. 11/324,545 is a continuation-in-part of application No. 10/459,870, said application No. 11/324,545 is a continuation-in-part of application No. 11/026,520, which is a continuation-in-part of application No. 10/459,936, said application No. 11/324,545 is a continuation-in-part of application No. 11/027,489, said application No. 11/324,545 is a continuation-in-part of application No. 11/081,856, which is a continuation-in-part of application No. 10/459,936, said application No. 11/324,545 is a continuation-in-part of application No. 11/082,194, which is a continuation-in-part of application No. 10/459,936, said application No. 11/528,858 is a continuation-in-part of application No. 11/324,572, which is a continuation-in-part of application No. 10/459,936, said application No. 11/324,572 is a continuation-in-part of application No. 10/459,768, said application No. 11/324,572 is a continuation-in-part of application No. 10/459,870, said application No. 11/324,572 is a continuation-in-part of application No. 11/026,520, which is a continuation-in-part of application No. 10/459,936, said application No. 11/324,572 is a continuation-in-part of application No. 11/027,489, said application No. 11/324,572 is a continuation-in-part of application No. 11/081,856, which is a continuation-in-part of application No. 10/459,936, said application No. 11/324,572 is a continuation-in-part of application No. 11/082,194, which is a continuation-in-part of application No. 10/459,936, said application No. 11/528,858 is a continuation-in-part of application No. 11/324,573, which is a continuation-in-part of application No. 10/459,936, and a continuation-in-part of application No. 10/459,870, said application No. 11/324,573 is a continuation-in-part of application No. 10/459,768, said application No. 11/324,573 is a continuation-in-part of application No. 10/459,870, said application No. 11/324,573 is a continuation-in-part of application No. 11/026,520, which is a continuation-in-part of application No. 10/459,936, said application No. 11/324,573 is a continuation-in-part of application No. 11/027,489, said application No. 11/324,573 is a continuation-in-part of application No. 11/081,856, which is a continuation-in-part of application No. 10/459,936, said application No. 11/324,573 is a continuation-in-part of application No. 11/082,194, which is a continuation-in-part of application No. 10/459,936, said application No. 11/528,858 is a continuation-in-part of application No. 11/324,496, which is a continuation-in-part of application No. 10/459,936, said application No. 11/324,496 is a continuation-in-part of application No. 10/459,870, said application No. 11/324,496 is a continuation-in-part of application No. 11/026,520, which is a continuation-in-part of application No. 10/459,936, said application No. 11/324,496 is a continuation-in-part of application No. 11/027,489, said application No. 11/324,496 is a continuation-in-part of application No. 11/081,856, which is a continuation-in-part of application No. 10/459,936, said application No. 11/324,496 is a continuation-in-part of application No. 11/082,194, which is a continuation-in-part of application No. 10/459,936.

(60) Provisional application No. 60/533,388, filed on Dec. 30, 2003, provisional application No. 60/387,969, filed on Jun. 12, 2002.

(56) References Cited

U.S. PATENT DOCUMENTS

| | | | |
|---|---|---|---|
| 7,162,724 B2 | 1/2007 | Blaser et al. | |
| 7,165,260 B2 | 1/2007 | Blaser et al. | |
| 7,461,086 B1 | 12/2008 | Hurren et al. | |
| 7,461,096 B1 | 12/2008 | Hurren et al. | |
| 7,496,931 B2 | 2/2009 | Cook et al. | |
| 7,512,977 B2 | 3/2009 | Cook et al. | |
| 7,519,963 B1 | 4/2009 | Blaser et al. | |
| 7,542,988 B1 | 6/2009 | Cook et al. | |
| 7,549,164 B2 | 6/2009 | Cook et al. | |
| 7,620,956 B2 | 11/2009 | Cook et al. | |
| 7,877,413 B1 | 1/2011 | Cook et al. | |
| 7,886,291 B1 | 2/2011 | Jones et al. | |
| 7,945,897 B1 | 5/2011 | Cook | |
| 7,970,789 B1 | 6/2011 | Blaser et al. | |
| 8,010,961 B1 | 8/2011 | Cook et al. | |
| 8,112,767 B1 | 2/2012 | Cook | |
| 2002/0022971 A1* | 2/2002 | Tanaka et al. | 705/1 |
| 2002/0133420 A1* | 9/2002 | McCoy et al. | 705/26 |
| 2005/0128511 A1 | 6/2005 | Hornback, Jr. et al. | |
| 2006/0031529 A1* | 2/2006 | Keith, Jr. | 709/227 |
| 2007/0180450 A1 | 8/2007 | Croft et al. | |
| 2011/0061045 A1 | 3/2011 | Phillips | |

OTHER PUBLICATIONS

"Citrix Brings Web 2.0 Applications Closer to the Enterprise with Acquisition of QuickTree," http://www.citrix.com/English/ne/news_print_p.asp?newsID=681434, Sep. 5, 2007 or earlier.

"MSDN Components and Features," http://msdn2.microsoft.com/en-us/library/aa368003(printer).aspx, Nov. 1, 2007 or earlier.

Jared Blaser; Process Tracking Application Layered System; U.S. Appl. No. 11/324,571, filed Jan. 3, 2006.

* cited by examiner

FEATURE BASED SOFTWARE VIRTUALIZATION

CROSS-REFERENCE

This is a continuation-in-part of U.S. patent application Ser. No. 11/026,520 filed Dec. 30, 2004, which: (1) claims the benefit of U.S. provisional patent application Ser. No. 60/533,388 filed on Dec. 30, 2003; and (2) is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002.

This is a continuation-in-part of U.S. patent application Ser. No. 11/027,489 filed Dec. 30, 2004, which claims the benefit of U.S. provisional patent application Ser. No. 60/533,388 filed on Dec. 30, 2003.

This is a continuation-in-part of U.S. patent application Ser. Nos. 11/081,856 and 11/082,194, each filed Mar. 16, 2005, each of which is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002.

This is a continuation-in-part of U.S. patent application Ser. Nos. 11/324,565, 11/324,571, 11/324,375, 11/324,607, 11/324,545, 11/324,572, 11/324,573 and 11/324,496, each filed Jan. 3, 2006, and each of which is: (1) a continuation-in-part of U.S. patent application Ser. Nos. 10/459,936 (now U.S. Pat. No. 7,117,495 issued Oct. 3, 2006), Ser. No. 10/459,768 (now U.S. Pat. No. 7,162,724 issued Jan. 9, 2007), and Ser. No. 10/459,870 (now U.S. Pat. No. 7,165,260 issued Jan. 16, 2007) filed Jun. 11, 2003, which each claim the benefit of U.S. provisional patent application Ser. No. 60/387,969 filed on Jun. 12, 2002; (2) a continuation-in-part of U.S. patent application Ser. No. 11/026,520 filed Dec. 30, 2004, which claims the benefit of U.S. provisional patent application Ser. No. 60/533,388 filed on Dec. 30, 2003; (3) a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002; (4) a continuation-in-part of U.S. patent application Ser. No. 11/027,489 filed Dec. 30, 2004, which claims the benefit of U.S. provisional patent application Ser. No. 60/533,388 filed on Dec. 30, 2003; and (5) a continuation-in-part of U.S. patent application Ser. Nos. 11/081,856 and 11/082,194, each filed Mar. 16, 2005, each of which is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002.

This is a continuation-in-part of U.S. patent application Ser. No. 11/528,858 filed Sep. 28, 2006, which is: (1) a continuation-in-part of Ser. No. 10/459,936 (now U.S. Pat. No. 7,117,495 issued Oct. 3, 2006), Ser. No. 10/459,768 (now U.S. Pat. No. 7,162,724 issued Jan. 9, 2007), and Ser. No. 10/459,870 (now U.S. Pat. No. 7,165,260 issued Jan. 16, 2007) filed Jun. 11, 2003, which each claim the benefit of U.S. provisional patent application Ser. No. 60/387,969 filed on Jun. 12, 2002; (2) a continuation-in-part of U.S. patent application Ser. No. 11/026,520 filed Dec. 30, 2004, which claims the benefit of U.S. provisional patent application Ser. No. 60/533,388 filed on Dec. 30, 2003 and is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002; (3) a continuation-in-part of U.S. patent application Ser. No. 11/027,489 filed Dec. 30, 2004, which claims the benefit of U.S. provisional patent application Ser. No. 60/533,388 filed on Dec. 30, 2003; (4) a continuation-in-part of U.S. patent application Ser. Nos. 11/081,856 and 11/082,194 each filed on Mar. 16, 2005, each of which is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002; (5) and a continuation-in-part of U.S. patent application Ser. Nos. 11/324,565, 11/324,571, 11/324,375, 11/324,607, 11/324,545, 11/324,572, 11/324,573 and 11/324,496 filed Jan. 3, 2006, each of which is: (a) a continuation-in-part of U.S. patent application Ser. No. 10/459,936 (now U.S. Pat. No. 7,117,495 issued Oct. 3, 2006), Ser. No. 10/459,768 (now U.S. Pat. No. 7,162,724 issued Jan. 9, 2007), and Ser. No. 10/459,870 (now U.S. Pat. No. 7,165,260 issued Jan. 16, 2007) filed Jun. 11, 2003, which each claim the benefit of U.S. provisional patent application Ser. No. 60/387,969 filed on Jun. 12, 2002; (b) a continuation-in-part of U.S. patent application Ser. No. 11/026,520 filed Dec. 30, 2004, which claims the benefit of U.S. provisional patent application Ser. No. 60/533,388 filed on Dec. 30, 2003; (c) a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002; (d) a continuation-in-part of U.S. patent application Ser. No. 11/027,489 filed Dec. 30, 2004, which claims the benefit of U.S. provisional patent application Ser. No. 60/533,388 filed on Dec. 30, 2003; and (e) a continuation-in-part of U.S. patent application Ser. Nos. 11/081,856 and 11/082,194 filed Mar. 16, 2005, each of which is a continuation-in-part of U.S. patent application Ser. No. 10/459,936 filed Jun. 11, 2003 (now U.S. Pat. No. 7,117,495 issued Oct. 3, 2006), which claims the benefit of U.S. provisional patent application Ser. No. 60/387,969 filed on Jun. 12, 2002.

The disclosures of the above patents and patent applications are hereby incorporated by reference in their entirety.

BACKGROUND INFORMATION

In computing, deployment and installation of computer software is typically performed using monolithic software packages. Such packages usually include one or more computer programs and features, at least some of which will not be used, or will rarely be used, in certain installations. Accordingly, many computing devices unnecessarily include unused or rarely-used computer programs and features.

Unfortunately, monolithic installation models often force users of computing devices to pay for unused computer programs and features in order to install and have access to desired computer programs and features. For example, a user of a computing device may be forced to purchase and install a software package including a suite of computer programs, even though the user wishes to utilize only one particular computer program or feature included in the software package.

The problems associated with monolithic software packages are exacerbated for an administrator or organization maintaining a computer system having a large number of computing devices. In such a configuration, installation and maintenance of monolithic software packages can waste significant resources, force payment of software licenses for unwanted or unused computer programs or features, and increase the chances of introducing conflicts between various computer programs into the computer system.

BRIEF DESCRIPTION OF THE DRAWINGS

Various embodiments are described with reference to the accompanying drawings, wherein like reference numbers designate like elements, and in which.

DETAILED DESCRIPTION

Figure 1:
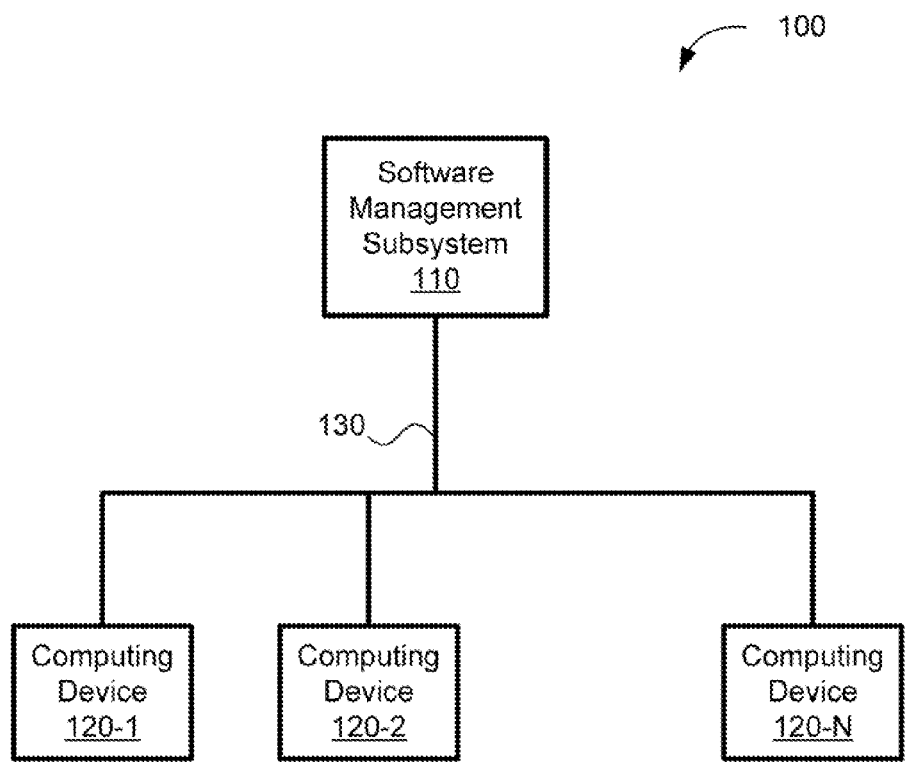
FIG. 1 illustrates an exemplary computing system configured for feature based software virtualization.

The disclosure is directed to feature based software virtualization. It should be appreciated that the examples disclosed herein may be implemented in numerous ways, including as one or more processes, apparatuses, systems, devices, methods, computer readable media, or computer program products embodied on computer readable media. Exemplary systems, apparatuses, computer program products embodied on computer readable media, and methods for feature based software virtualization are described herein.

As used herein, the terms "software" and "software package" refer broadly to any set of computer readable instructions embodied on one or more computer readable media, the instructions being executable by a computing device. Software packages may include one or more computer programs (e.g., applications) and any components and features of the computer programs. Features may include various functionalities provided by software packages. Features included in a software package may be componentized into feature sets, as described further below. A feature set may include a subset of one or more features of a software package.

"Virtualization" of software refers to performance of one or more operations to virtually install software to a computing device such that the software, and/or one or more feature sets of the software, may be conveniently enabled (i.e., "turned on") and disabled (i.e., "turned off"). When virtually installed software is enabled, access requests associated with the virtually installed software are generally redirected from a base file system and configuration to one or more memory locations to which the software has been virtually installed. When the virtually installed software is disabled, access requests are not redirected, but allowed to pass through to the base file system and configuration.

As described in more detail further below, software may be virtualized, and enabled or disabled, at a feature set level, such that different feature sets of a software package can be virtually installed and conveniently "turned on" and "turned off" at a feature set level. Accordingly, custom configurations of feature sets of software packages may be deployed and virtually installed to computing devices.

In certain embodiments, configurations of virtually installed software packages may be implemented in response to detected requests for and/or detected use or nonuse of features of the software packages, as described further below. In certain embodiments, fees for software may be charged at a feature set level and may be based on usage of features, as described further below.

In one embodiment, a first virtual sub-layer associated with a first feature set of a software package is virtually installed to a computing device. The first feature set includes a first subset of features associated with the software package. The first virtual sub-layer is enabled to activate the first feature set. A second virtual sub-layer associated with a second feature set of the software package is virtually installed to the computing device. The second feature set includes a second subset of the features associated with the software package. The second virtual sub-layer is enabled to activate the second feature set. In certain embodiments, a first fee is charged for the first feature set and a second fee is charged for the second feature set.

In another embodiment, a computer program product embodied in a computer readable medium and comprising computer instructions executable by a computing device is configured to direct the computing device to perform the functions of virtually installing to the computing device a first virtual sub-layer associated with a first feature set of a software package and a second virtual sub-layer associated with a second feature set of the software package, and selectively and individually enabling at least one of the first virtual sub-layer to activate the first feature set and the second virtual sub-layer to active the second feature set.

In another embodiment, a system comprises a software management subsystem configured to maintain a plurality of virtual sub-layers associated with a plurality of feature sets, each of the features sets including a subset of features of a software package. The system further comprises at least one computing device communicatively coupled to the software management subsystem. The software management subsystem is configured to selectively and individually deliver at least one of the virtual sub-layers to the computing device. The computing device is configured to receive and virtually install the delivered virtual sub-layer(s).

Turning now to the drawings. FIG. 1 illustrates an exemplary computing system 100 (or simply "the system 100") configured for feature based software virtualization as described herein. As shown, the computing system 100 may include a software management subsystem 110 communicatively coupled to computing devices 120-1 through 120-N (collectively "the computing devices 120"). The software management subsystem 110 and computing devices 120 may communicate with one another using any suitable communication technologies. For example, the software management subsystem 110 and computing devices 120 may communicate over a network 130 using any suitable communication technologies, including suitable network communication technologies, devices, signals, and protocols capable of supporting the processes and communications described herein.

Network 130 may include any type, number, and configuration of networks capable of carrying communication signals between devices connected to the network 130, including but not limited to a local area network, a wide area network, a peer-to-peer network, a wireless network, a data network, an intranet, the Internet, and combinations or sub-combinations thereof. In other embodiments, the software management subsystem 110 and the computing devices 120 may communicate directly, such as over a communication bus or other communication link.

In certain embodiments, computing system 100 may include any computer hardware and/or instructions (e.g., software programs), or combinations of software and hardware, configured to perform the processes described herein. In particular, it should be understood that system 100 may include any of a number of computing devices, and may employ any of a number of computer operating systems, including, but by no means limited to, known versions and/or varieties of the Microsoft Windows, UNIX, Macintosh, and Linux operating systems.

Accordingly, the processes described herein may be implemented at least in part as instructions, e.g., one or more computer program products, embodied on computer readable media and executable by one or more computing devices. In general, a processor (e.g., a microprocessor) receives instructions, e.g., from a memory, a computer readable medium, etc., and executes those instructions, thereby performing one or more processes, including one or more of the processes described herein. Such instructions may be stored and transmitted using a variety of known computer readable media.

A computer readable medium (also referred to as a processor readable medium) includes any medium that participates in providing data (e.g., instructions) that may be read by a computer (e.g., by a processor of a computer). Such a medium may take many forms, including, but not limited to, non-volatile media, volatile media, and transmission media. Non-volatile media may include, for example, optical or magnetic disks and other persistent memory. Volatile media may include, for example, dynamic random access memory ("DRAM"), which typically constitutes a main memory. Transmission media may include, for example, coaxial cables, copper wire and fiber optics, including the wires that comprise a system bus coupled to a processor of a computer. Transmission media may include or convey acoustic waves, light waves, and electromagnetic emissions, such as those generated during radio frequency ("RF") and infrared ("IR") data communications. Common forms of computer readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

While an exemplary computing system 100 is shown in FIG. 1, the exemplary components illustrated in FIG. 1 are not intended to be limiting. Indeed, additional or alternative components, implementations, or computing systems may be used to implement the principles and processes described herein.

Software management subsystem 110 may include or be implemented in one or more devices, including one or more devices configured to communicate with computing devices 120 over network 130. In certain embodiments, for example, software management subsystem 110 may include or be embodied on one or more server devices, which may be configured to operate server software such as Altiris® Notification Server™ software provided by Altiris, Inc., a division of Symantec Corporation. Software management subsystem 110 may include and may be configured to execute computer readable instructions (e.g., one or more computer program products) embodied on one or more computer readable media. The computer readable instructions may be configured to direct execution of one or more feature based software virtualization and/or deployment operations. Accordingly, a user of software management subsystem 110, such as an administrator of system 100, may utilize the software management subsystem 110 to control operations for virtualizing and/or deploying software packages and/or certain software package feature sets to the computing devices 120 over network 130.

For example, software management subsystem 110 may receive or otherwise access a software package distributed by an entity such as the manufacturer or distributor of the software package. The package may be made accessible for download over the Internet, for example. Under the direction of a user, software management subsystem 110 may deliver the software package, or one or more feature sets of the software package, to one or more of the computing devices 120 over network 130. Data representative of the software package, or one or more feature sets of the software package, may be transmitted using any suitable technologies and in any acceptable form.

In certain embodiments, the software management subsystem 110 may be configured to deliver an install executable for installing the software package to a computing device 120. In such embodiments, the computing device 120 may be configured to virtualize the software package. In other embodiments, the software management subsystem 110 may be configured to virtualize the software package and export data representative of the virtualized software package, or components thereof, to the computing device 120. The computing device 120 may store the virtualized software package and/or components thereof to one or more memory locations to virtually install the virtualized software package and/or components thereof to the computing device 120. In other embodiments, the software management subsystem 110 and the computing device 120 may divide the virtualization operations. Accordingly, the software management subsystem 110 and/or the computing device 120 may perform one or more software virtualization operations associated with virtualizing a software package and/or components thereof. Examples of virtualization operations will now be described in more detail.

Virtualization of a software package may include capturing the software package, which, in certain embodiments, may include capturing an install executable for the software package and generating one or more virtual layers for the software package. This may be performed in any of the ways described in U.S. Pat. No. 7,117,495, the disclosure of which is hereby incorporated by reference in its entirety. A virtual layer may include one or more folders or directories to which one or more components (e.g., program files, executables, configuration files, configuration information, settings, etc.) of the software package may be stored. A virtual layer may be stored to one or more memory locations to virtually install the virtual layer. As described further below, the memory locations are separate from memory locations associated with a base file system and configuration libraries of a computing device 120.

The process of capturing the software package may include componentizing one or more features of the software package into one or more feature sets. This may be performed in any suitable manner, including identifying and grouping features based on a predefined componentization heuristic, which may be configured to group features at a conceptual level. As another example, a manufacturer of a software package may have already componentized the software package, and this componentization may be carried through to the virtualized software package. As an example, a manufacturer of a software package may divide a software package into separate installable components associated with individual computer programs and/or features within the software package, and the capture process may be configured to maintain these components as feature sets of the virtualized software package.

The capturing process may further include generating one or more virtual sub-layers and storing virtualized components of the software package to one or more of the virtual sub-layers. A virtual sub-layer may be generated similarly to a virtual layer, except that each virtual sub-layer includes one or more components (e.g., program files, executables, configuration files, configuration information, settings, etc.) for operating a subset of the features (i.e., a feature set) associated with the software package. Virtual sub-layers may enable various feature sets of the software package to be conveniently, selectively, and individually deployed and turned on and off. Exemplary virtual sub-layers will be described in more detail further below.

The capturing process may further include generating mapping data that can be used for redirecting access requests generated by a virtualized software package from a base file system and configuration libraries to other memory locations associated with one or more virtual layers and/or sub-layers. Accordingly, the virtualized software package can execute its operations using content included in virtual layers and/or sub-layers without changing or using the base file system and configuration libraries.

A virtualized software package and/or components thereof may be virtually installed to a computing device 120. This may include storing one or more virtual layers and/or sub-layers to memory locations within the computing device 120. Virtual installation may also include generating, updating, and/or storing mapping data based on the memory locations to which the virtual layers and/or sub-layers are stored. The mapping data may be configured for use in redirecting access requests to memory locations associated with virtual layers and/or sub-layers.

To illustrate these principles, an exemplary software virtualization system 200 and exemplary feature based configurations of virtualized software will now be described with reference to FIGS. 2A-G. The software virtualization system 200 and exemplary configurations shown in FIGS. 2A-G may be implemented in a computing device environment of one or more suitable computing devices, including any of the computing devices 120. A computing device 120 may include any hardware and computing instructions (e.g., one or more computer program products) capable of performing one or more of the processes described herein, including communicating with the software management subsystem 110, and virtualizing and/or operating one or more virtualized software packages and/or components thereof as described herein. The computing device 120 may include, but is in no way limited to, a personal computer, a workstation, a personal digital assistant, or any device having a processor, memory, input and output devices, and at least one fixed disk. It is contemplated that the principles described herein may be applied to these and other computing systems and devices, both existing and yet to be developed, using the methods and principles disclosed herein. Likewise, although many of the examples below refer to a computing device with a single base file system and configuration, the concepts, principles, and examples disclosed below may be extended to provide feature based software virtualization functionality across several or many file systems and/or configurations (e.g., registries).

Figure 2A:
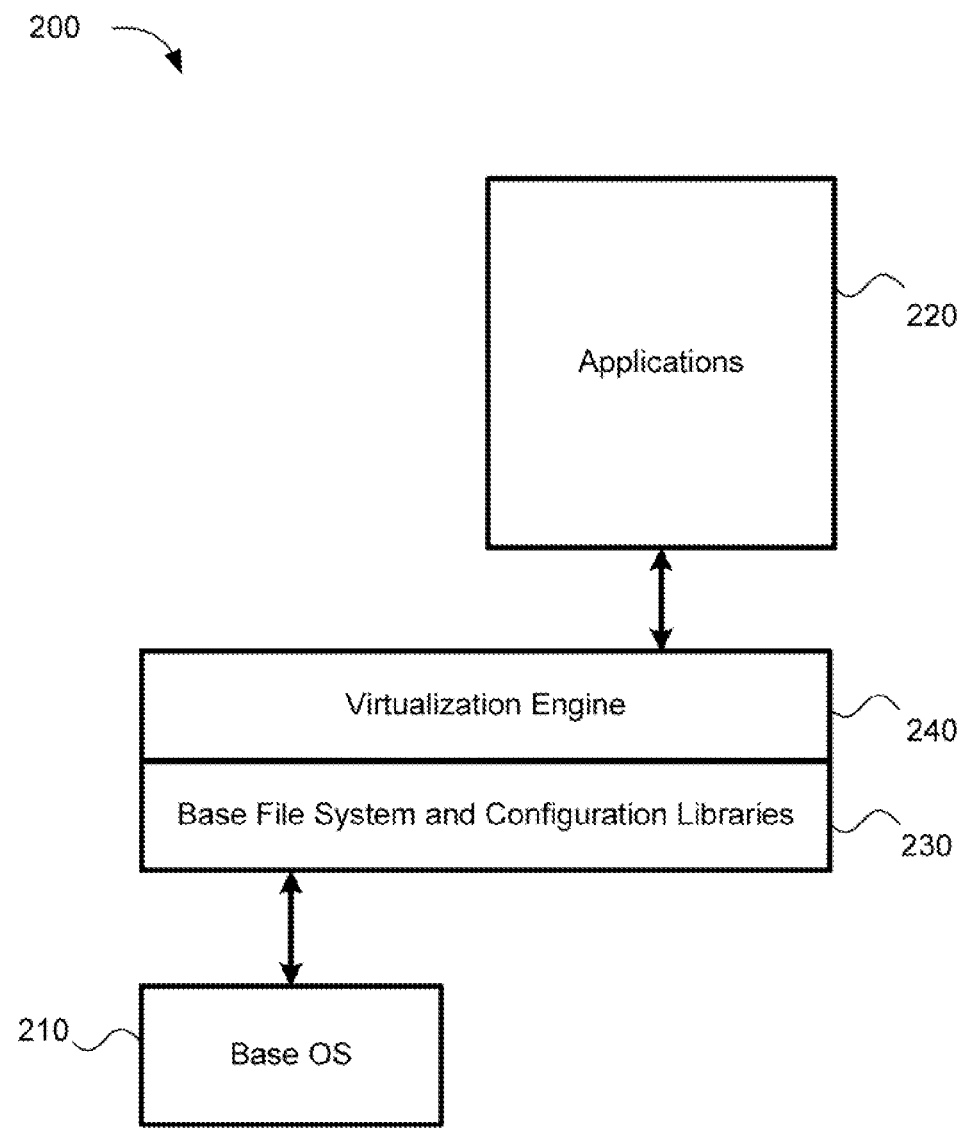
FIG. 2A illustrates an exemplary virtualization system in a computing device environment.

As shown in FIG. 2A, virtualization system 200 may be implemented in an exemplary computing device environment having a base operating system ("base OS") 210 forming a platform with which one or more applications 220 (e.g., software applications, which may be part of one or more software packages) can be run and files can be accessed in file systems. In certain embodiments, base OS 210 comprises Microsoft Windows operating system software.

Base OS 210 may include base configuration settings (e.g., registry settings) and files that are globally available to applications 220 for reading and writing operations. The configuration settings and files of the base OS 210 may be included in base file system and configuration libraries 230, also referred to as a base file system and configuration 230, for use in executing the functions of the base OS 210 including operating file systems, configuration settings such as registries, and other operating system functions. The base file system and configuration libraries 230, including the base files and configuration settings of the base OS 210, may be stored to a particular location in the memory of a computing device 120.

As shown in FIG. 2A, the virtualization system 200 may include a virtualization engine 240, which may include any hardware (e.g., a processor), computer-readable instructions (e.g., a computer program product), or combination thereof configured to perform one or more of the operations disclosed herein. In certain embodiments, virtualization engine 240 may be implemented as a software agent installed to a computing device 120.

Virtualization engine 240 may be configured to perform, or direct execution of, one or more feature based software virtualization operations, including any of those disclosed herein. As an example, in certain embodiments, virtualization engine 240 may be configured to virtualize a software package, including performing and/or directing execution of any of the following operations: capturing the software package, componentizing the software package into one or more feature sets, generating one or more virtual layers and/or sub-layers, virtually installing the virtual layers and/or sub-layers (e.g., by storing them to memory locations), and generating mapping data for redirecting access requests from the base file system and configuration 230 to the virtual layers and/or sub-layers. In certain examples, the virtualization engine 240 may receive a non-virtualized software install executable for a software package and perform the above-listed steps to virtualize the software package. In other examples, the virtualization engine 240 may receive export data representing one or more virtual layers and/or sub-layers from the software management subsystem 110 and virtually install the virtual sub-layers and/or sub-layers (e.g., by storing them to one or more memory locations).

Virtualization engine 240 may be configured to intercept access requests (e.g., file system and registry access requests) from applications 220 and to determine, based on predefined mapping data, where to redirect the access requests. Accordingly, virtualization engine 240 may selectively redirect access requests for content of the base file system and configuration 230 to content of a virtually installed and enabled application and/or components thereof that have been stored at a separate and isolated location in memory, such as in a virtual layer and/or sub-layer. In certain embodiments, the virtual installation and enablement of a software application and/or components thereof allow redirections to be performed such that the application and operating system of the computing device 120 are unaware of the redirections.

In certain embodiments, the virtualization engine 240 is associated with the base file system and configuration 230 and/or the base OS 210. As an example, at least a portion of the virtualization engine 240 may be implemented as one or more drivers (e.g., filter drivers) at the operating system kernel level and configured to monitor input and output requests for files and configuration settings stored in the base file system and configuration libraries 230. This may be accomplished by monitoring calls that go through an OS kernel I/O subsystem. In certain embodiments, functionality for intercepting and redirecting access requests may be implemented based at least in part on the teachings included in the aforementioned U.S. Pat. No. 7,117,495, for example.

FIG. 2A illustrates the virtualization system 200 having the virtualization engine 240 configured to operate in a state in which there are no software applications virtually installed or enabled in the computing environment. Accordingly, the virtualization engine 240 is generally configured to permit access requests from the applications 220 to continue on to content in the base file system and configuration libraries 230.

Figure 2B:
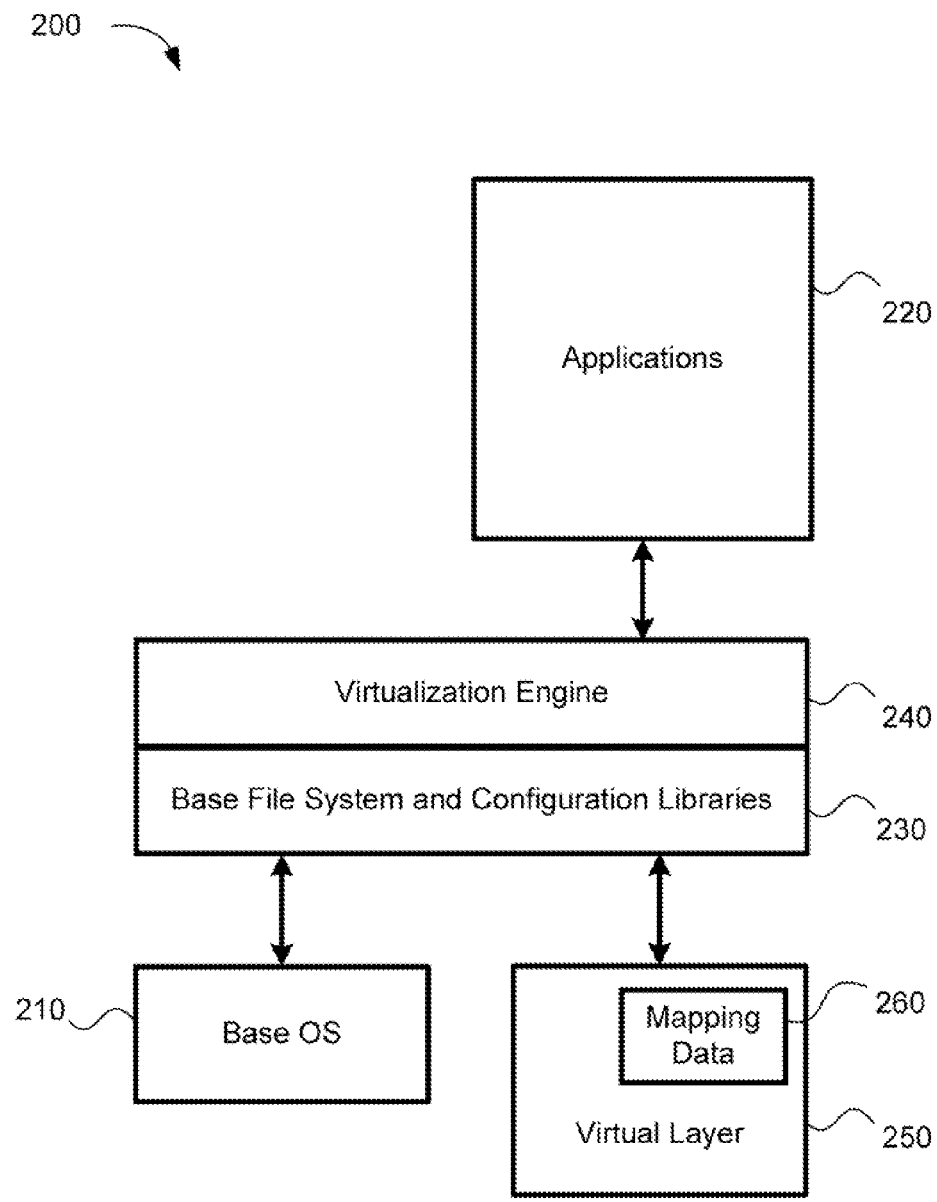
FIG. 2B illustrates the computing device environment of FIG. 2A with a virtual layer virtually installed thereto.

FIG. 2B illustrates the virtualization system 200 at a stage in which a software application is virtually installed to computing device 120 as virtual layer 250. Data representing the application and/or the virtual layer 250 may be received from any suitable source and in any acceptable manner, including by transmission from the software management subsystem 110 over network 130.

As mentioned, the virtualization engine 240 may perform any of the virtualization operations described above to virtualize the application. In some examples, this may include creating virtual layer 250 for the application, storing content of the application to the virtual layer 250, and generating and storing mapping data 260 for the virtual layer 250. As shown in FIG. 2B, in some embodiments the mapping data 260 may be stored in the virtual layer 250. Alternatively, the mapping data 260 may be stored at another location external of the virtual layer 250. In other examples, the virtualization engine 240 may receive the virtual layer 250 from the software management subsystem 110 and virtually install the virtual layer 250 by storing it to a memory location.

The mapping data 260 may include any information potentially helpful for identifying an appropriate location in memory (e.g., virtual layer 250) to which an access request should be directed. Information in the mapping data 260 may be formatted and organized in any way that is suitable for the information to be used for redirecting access requests, enabling virtual layer 250, and disabling virtual layer 250. In certain embodiments, the mapping data 260 includes one or more tables of information organized such that the information can be searched by index, keyword, or other criterion.

As an example of generating mapping data 260, assume that an application includes a particular application object (e.g., a DLL file) designed to replace a file object that is part of the base file system and configuration 230. During virtual installation of the application, the virtualization engine 240 and/or the software management subsystem 110 can identify the file object and/or its location (e.g., pathname), the application object and/or its location in the virtual layer 250, and the relationship between the file object and the application object and/or their respective locations. References to the identified information may be recorded and included as part of the mapping data 260. In this or another suitable manner, the mapping data 260 can be said to define relationships between the content of the virtual layer 250 and the content of the base file system and configuration 230.

Figure 2C:
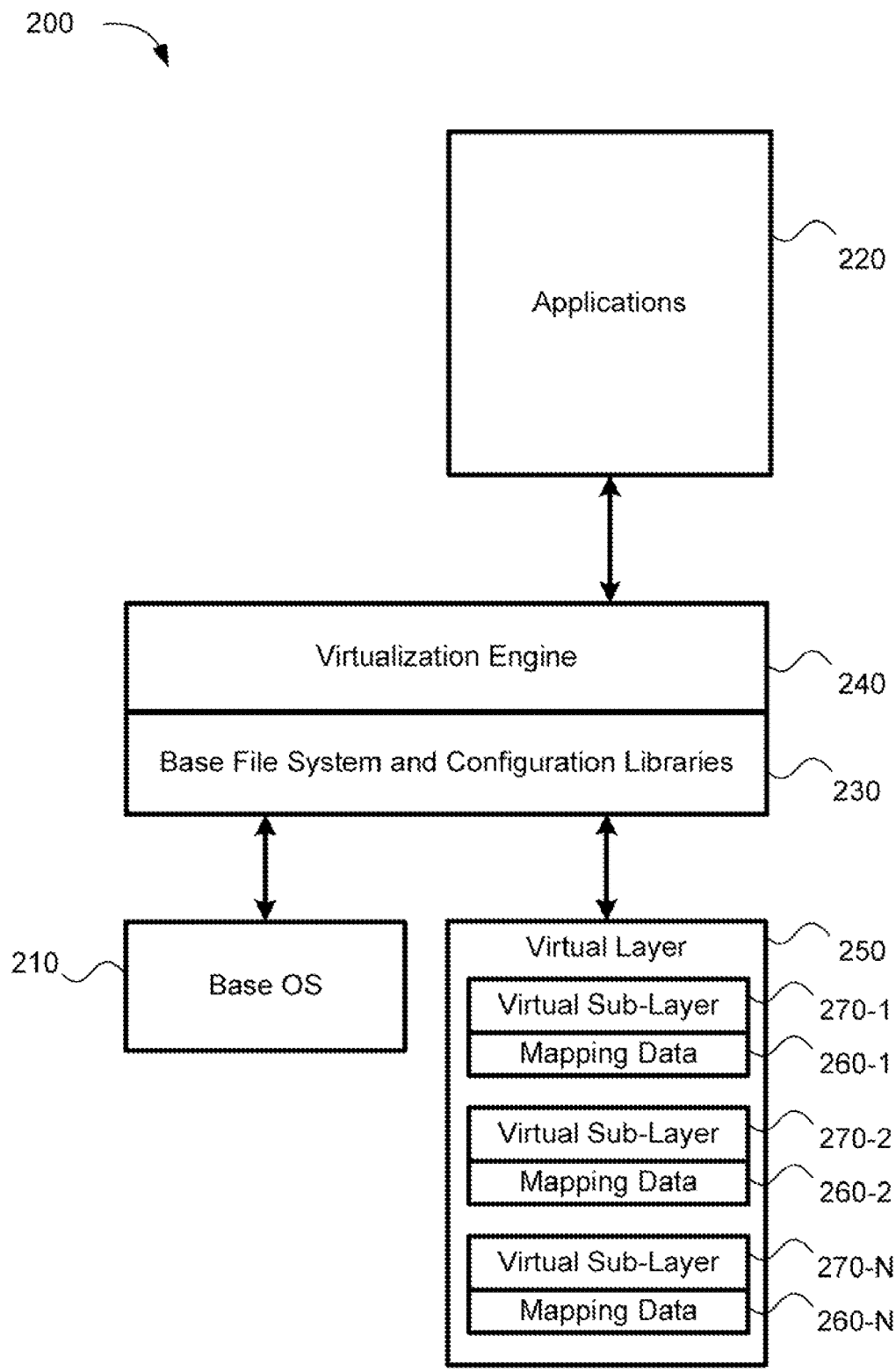
FIG. 2C illustrates the computing device environment of FIG. 2B with an exemplary configuration of virtual sub-layers installed thereto.

FIG. 2C illustrates the virtualization system 200 at a stage in which various feature sets associated with a software application have been virtually installed to computing device 120 as virtual sub-layers 270-1 through 270-N (collectively "virtual sub-layers 270"). The virtualization engine 240 may receive or create the virtual sub-layers 270, which may be included within virtual layer 250 as shown in FIG. 2C. The virtualization engine 240 may also receive and/or generate instances of mapping data 260-1 trough 260-N that can be used to redirect access requests to corresponding virtual sub-layers 270-1 through 270-N, respectively.

The virtual sub-layers 270 may be associated with various feature sets of the virtualized application. For example, virtual sub-layer 270-1 may be associated with a first feature set, virtual sub-layer 270-2 may be associated with a second feature set, and virtual sub-layer 270-N may be associated with an $N^{th}$ feature set. Each of the feature sets may include a different subset of the features of the software application. Content of the virtualized application may be componentized in feature sets as described above, and the componentized content may be stored in respective virtual sub-layers 270. As described herein, the virtual sub-layers 270 may be used for selectively, individually, and conveniently "turning on" and "turning off" various feature sets of the virtualized software application.

The virtual layer 250 and virtual sub-layers 270 may include any content associated with a software package and feature sets of the software package. The virtual layer 250 and virtual sub-layers 270 may be created at one or more memory locations that are isolated from the memory locations of the base file system and configuration 230. Instead of overwriting the memory locations of the base file system and configuration 230 as may happen in an actual installation of a software package, in a virtual installation the contents of the software package are stored to one or more other memory locations as virtual layer 250 and/or virtual sub-layers 270, so as to preserve the contents of base file system and configuration 230.

The mapping data 260 associated with virtual layer 250 may be componentized to form instances of mapping data 260-1 through 260-N that correspond with various virtual sub-layers 270-1 through 270-N. Each mapping data instance may include content that can be used for redirecting access requests from the base file system and configuration 230 to a corresponding virtual sub-layer 270.

In FIG. 2C, virtual layer 250 and sub-layers 270 are virtually installed but not enabled. Accordingly, the virtualization engine 240 will permit access requests to pass through to the base file system and configuration 230, without being considered for redirection to virtual layer 250 or sub-layers 270. In other words, when the virtual layer 250 and sub-layers 270 are not enabled, the virtualization engine 240 is configured not to redirect access requests to virtual layer 250 or sub-layers 270.

Figure 2D:
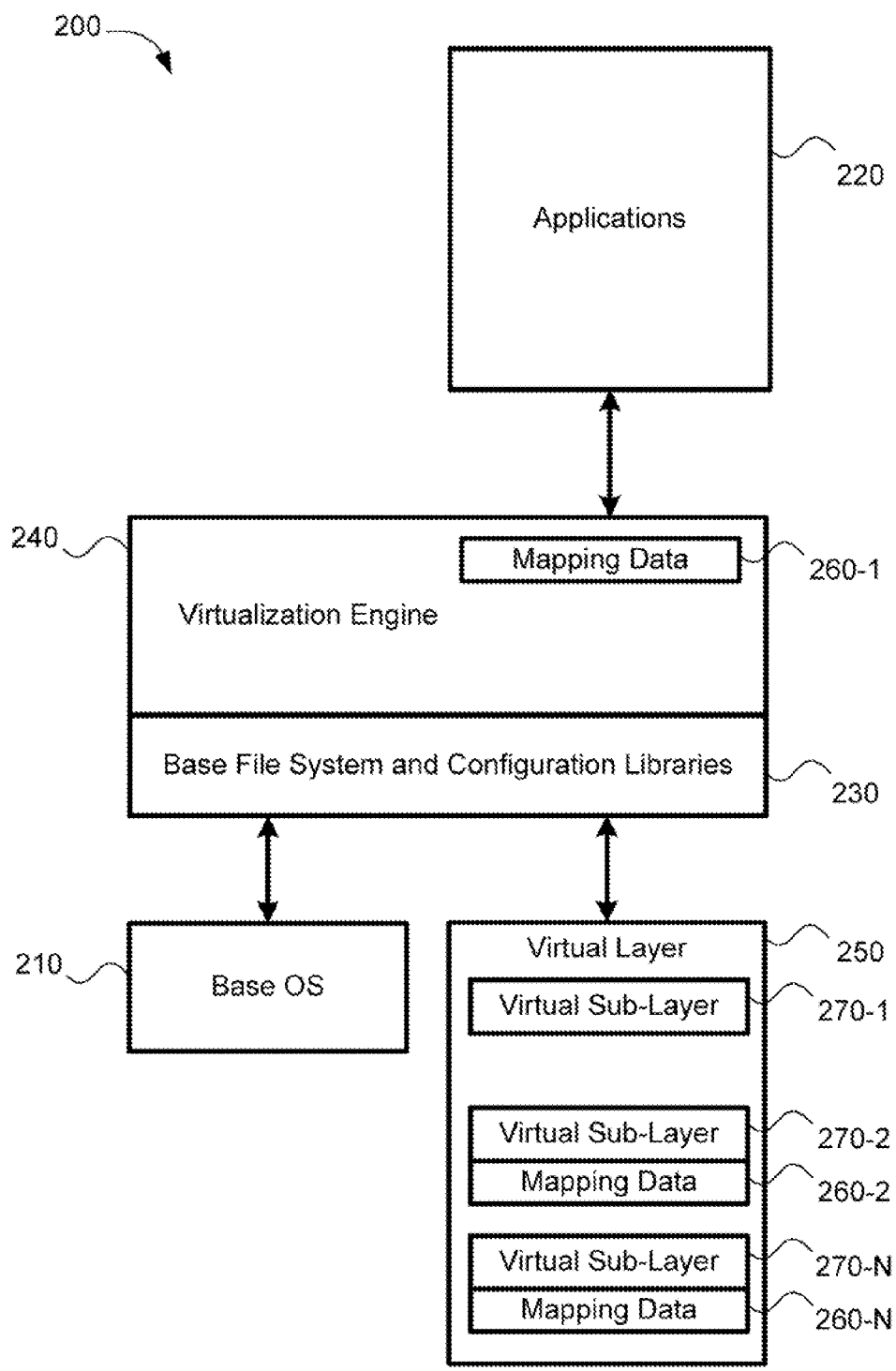
FIG. 2D illustrates the computing device environment of FIG. 2C with a virtual sub-layer enabled.

FIG. 2D illustrates the virtualization system 200 at a stage in which virtual sub-layer 270-1 is virtually installed and enabled. The virtualization engine 240 may be configured to enable virtual sub-layer 270-1. In certain embodiments, enablement of virtual sub-layer 270-1 includes activating mapping data 260-1 associated with the virtual sub-layer 270-1 by applying the mapping data 260-1 to the virtualization engine 240. In FIG. 2D, activation of mapping data 260-1 is represented by the mapping data 260-1 being moved, or a copy of the mapping data 260-1 being injected, into the virtualization engine 240. In certain embodiments, this includes injecting mapping data 260-1 into an OS kernel filter driver of the virtualization engine 240.

With mapping data 260-1 activated, the virtualization engine 240 is configured to selectively redirect certain access requests from the base file system and configuration 230 to virtual sub-layer 270-1. For example, the virtualization engine 240 may intercept an access request from an application 220, the request including a reference for a particular file object or memory location of the base file system and configuration 230. The virtualization engine 240 may use the activated mapping data 260-1 to determine whether the reference is associated with enabled virtual sub-layer 270-1. This determination may be performed in any suitable manner, including searching the mapping data 260-1 for the reference. If a match is found, the virtualization engine 240 may redirect the access request to a corresponding object in virtual sub-layer 270-1. The corresponding object may then be accessed and returned to the application 220, the application 220 being unaware of the redirection having taken place. Accordingly, from the view of the application 220, it is as if the feature set associated with the virtually installed and enabled virtual sub-layer 270-1 had been actually installed to the base file system and configuration 230.

With virtual sub-layer 270-1 enabled, the features within the feature set corresponding with virtual sub-layer 270-1 are active and available for use by an application 220 associated with virtual sub-layer 270. In the example shown in FIG. 2D, virtual sub-layers 270-2 and 270-N are virtually installed but not enabled. Accordingly, the features within the feature sets corresponding with virtual sub-layers 270-2 and 270-N may be inactive and unavailable for use by the application 220. However, any of the virtual sub-layers 270-1 through 270-N may be conveniently, selectively, and individually enabled or disabled to activate or deactivate corresponding feature sets. For example, virtual sub-layer 270-2 may be enabled.

Figure 2E:
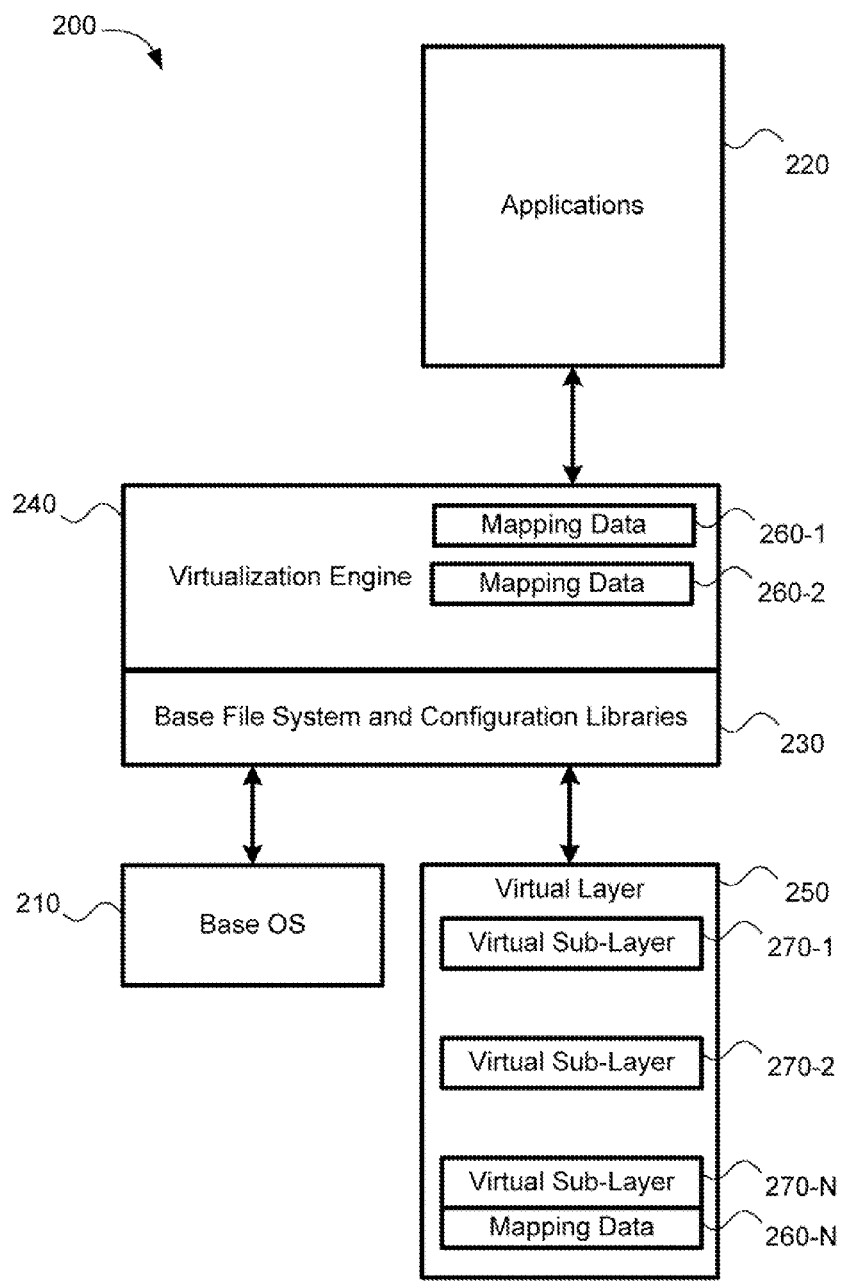
FIG. 2E illustrates the computing device environment of FIG. 2D with another virtual sub-layer enabled.

FIG. 2E illustrates the virtualization system 200 at a stage in which virtual sub-layers 270-1 and 270-2 are installed and enabled, as represented by the activation of mapping data 260-1 and 260-2 in the virtualization engine 240. In the stage shown in FIG. 2E, mapping data 260-1 and 260-2 corresponding with the virtual sub-layers 270-1 and 270-2 may be considered by the virtualization engine 240 when determining where to direct access requests. Accordingly, the features within the feature sets corresponding with virtual sub-layers 270-1 and 270-2 are active and available for use by the application 220, while features within the feature set corresponding with virtual sub-layer 270-N may be inactive and unavailable for use by the application 220.

Figure 2F:
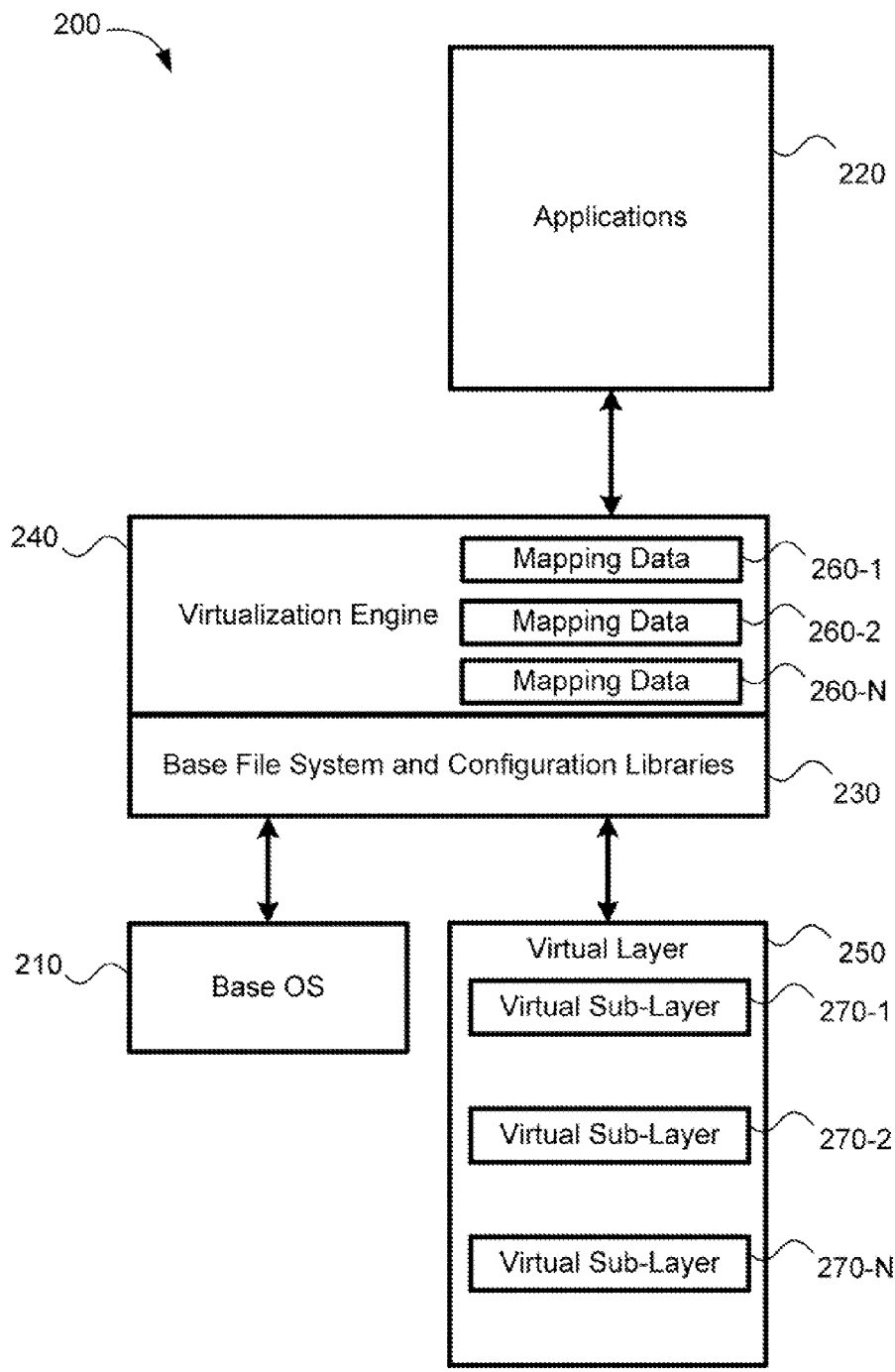
FIG. 2F illustrates the computing device environment of FIG. 2E with yet another virtual sub-layer enabled.

FIG. 2F illustrates the virtualization system 200 at a stage in which virtual sub-layers 270-1, 270-2, and 270-N are installed and enabled, as represented by the activation of mapping data 260-1, 260-2, and 260-N in the virtualization engine 240. In the stage shown in FIG. 2F, mapping data 260-1, 260-2, and 260-N corresponding with the virtual sub-layers 270-1, 270-2, and 270-N, respectively, may be considered by the virtualization engine 240 when determining where to direct access requests. Accordingly, the features within the feature sets corresponding with virtual sub-layers 270-1, 270-2, and 270-N are active and available for use by the application 220.

The virtualization engine 240 may be configured to selectively, individually, and conveniently disable an enabled layer, including virtual layer 250 and/or one or more virtual sub-layers 270. This may be performed in any suitable manner, including removing mapping data 260 or instances of mapping data 260-1, 260-2, and/or 260-N from the virtualization engine 240. For example, FIG. 2E may illustrate the virtualization system 200 at a stage in which virtual sub-layer 270-N has been disabled by removing mapping data 260-N from the virtualization engine 240 configuration shown in FIG. 2F. Similarly, FIG. 2D may illustrate the virtualization system 200 at a stage in which virtual sub-layer 270-2 has been disabled by removing mapping data 260-2 from the virtualization engine 240 configuration shown in FIG. 2E. Similarly, FIG. 2C may illustrate the virtualization system 200 at a stage in which virtual sub-layer 270-1 has been disabled by removing mapping data 260-1 from the virtualization engine 240 configuration shown in FIG. 2D.

Removal of mapping data from the virtualization engine 240 may set the virtualization engine 240 to a state in which access requests for the base file system and configuration 230 will no longer be redirected to an associated disabled virtual layer 250 or sub-layer 270, but will be allowed to pass through to the base file system and configuration 230.

Figure 2G:
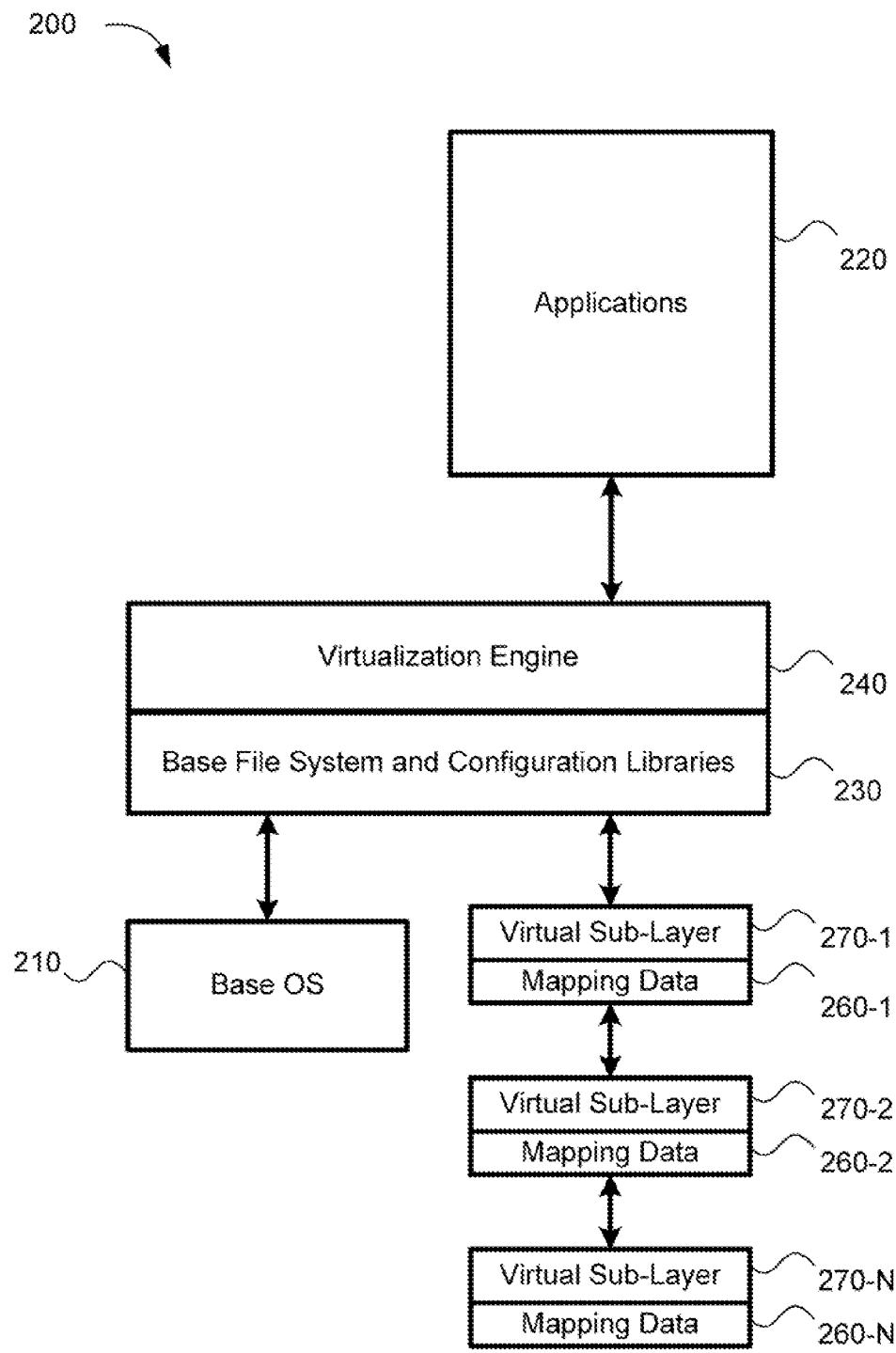
FIG. 2G illustrates the computing device environment of FIG. 2B with another exemplary configuration of virtual sub-layers installed thereto.

FIGS. 2C-F show virtual sub-layers 270 within a virtual layer 250. This is illustrative only. The principles disclosed herein may be used to create other configurations of virtual sub-layers 270. For example, FIG. 2G illustrates the computing device environment of FIG. 2B with an exemplary configuration of virtual sub-layers 270-1 through 270-N installed thereto. As shown in FIG. 2G, virtual sub-layers 270-1 through 270-N are not included within a virtual layer such as virtual layer 250. In this configuration, the virtual sub-layers 270-1 through 270-N may be associated with the corresponding virtualized software application in any suitable manner, such as by using a common identifier associated with the application. For example, the virtualization engine 240 may be configured to use such an identifier to identify access requests associated with the application and to redirect the access requests to one of the enabled virtual sub-layers 270 that are associated with the application.

As shown in FIGS. 2C-G, various feature based custom configurations of a virtualized software application may be implemented in a computing device environment. Such configurations of feature sets may be implemented by conveniently enabling and disabling virtual sub-layers 270 associated with feature sets to activate and deactivate application features at a feature set level. In this manner, a computing device 120 may be custom configured for executing certain features of a virtualized software application, which features may be a subset of all the features associated with the software application.

As an example, virtual layer 250 may be associated with a virtualized word processing software application that has been virtually installed to a computing device 120. Virtual sub-layer 270-1 may be associated with a feature set including certain core functionalities of the application and may be enabled as shown in FIG. 2D. Accordingly, the computing device 120 may be configured to execute the core functionalities of the application associated with virtual sub-layer 270-1 but not other functionalities in the feature sets associated with virtual sub-layers 270-2 and 270-N.

However, the configuration may be conveniently modified. Virtual sub-layer 270-2 and/or virtual sub-layer 270-N may be selectively, individually, and conveniently enabled as described above to activate their respective feature sets. Similarly, virtual sub-layer 270-1 may be selectively, individually, and conveniently disabled as described above to deactivate its respective feature set.

Enablement and disablement of virtual sub-layers 270 may be performed in response to detection of certain trigger events, such as a detected request for a feature, or detected use or nonuse of one or more features. The virtualization engine 240 may be configured to detect one or more predefined trigger events and to enable and/or disable virtual layer 250 and/or one or more virtual sub-layers 270 in response to detection of such as event. Exemplary events may include, but are not limited to, a request for a feature that is not enabled, use of features in a feature set, and nonuse of one or more features in a feature set for a certain period of time (e.g., one week or one month). Trigger events may be detected in any suitable manner, including the virtualization engine 240 monitoring for certain access requests or function calls. In certain embodiments, the monitoring may be performed by one or more filter drivers at the OS kernel level.

To continue the above example, a user of the computing device 120 may attempt to use a feature (e.g., an equation editor) not included in the core functionality associated with enabled virtual sub-layer 270-1. The virtualization engine 240 may detect the request for the feature and identify it as being associated with virtually installed but not enabled virtual sub-layer 270-2. The virtualization engine 240 may enable virtual sub-layer 270-2 as described above to activate (i.e., turn on) the associated feature set including the requested feature.

To continue this example further, the virtualization engine 240 may subsequently detect nonuse of the features in the feature set of virtual sub-layer 270-2 for a certain period of time. In response, the virtualization engine 240 may disable virtual sub-layer 270-2 as described above to deactivate (i.e., turn off) the associated feature set.

Based on the examples described above, a computing device 120 may have virtually installed thereto a library of virtual sub-layers 270 including software feature sets that may be conveniently turned on and off to activate and deactivate particular feature sets. Alternate or in addition to enabling and disabling virtual sub-layers 270 to activate and deactivate corresponding feature sets as described above, virtual sub-layers 270 may be used for deployment and removal of software features at a feature set level, which may be especially useful in a computing system 100 having a plurality of computing devices 120. To illustrate, FIGS. 3A-B respectively illustrate two feature based virtualized software deployment configurations.

Figure 3A:
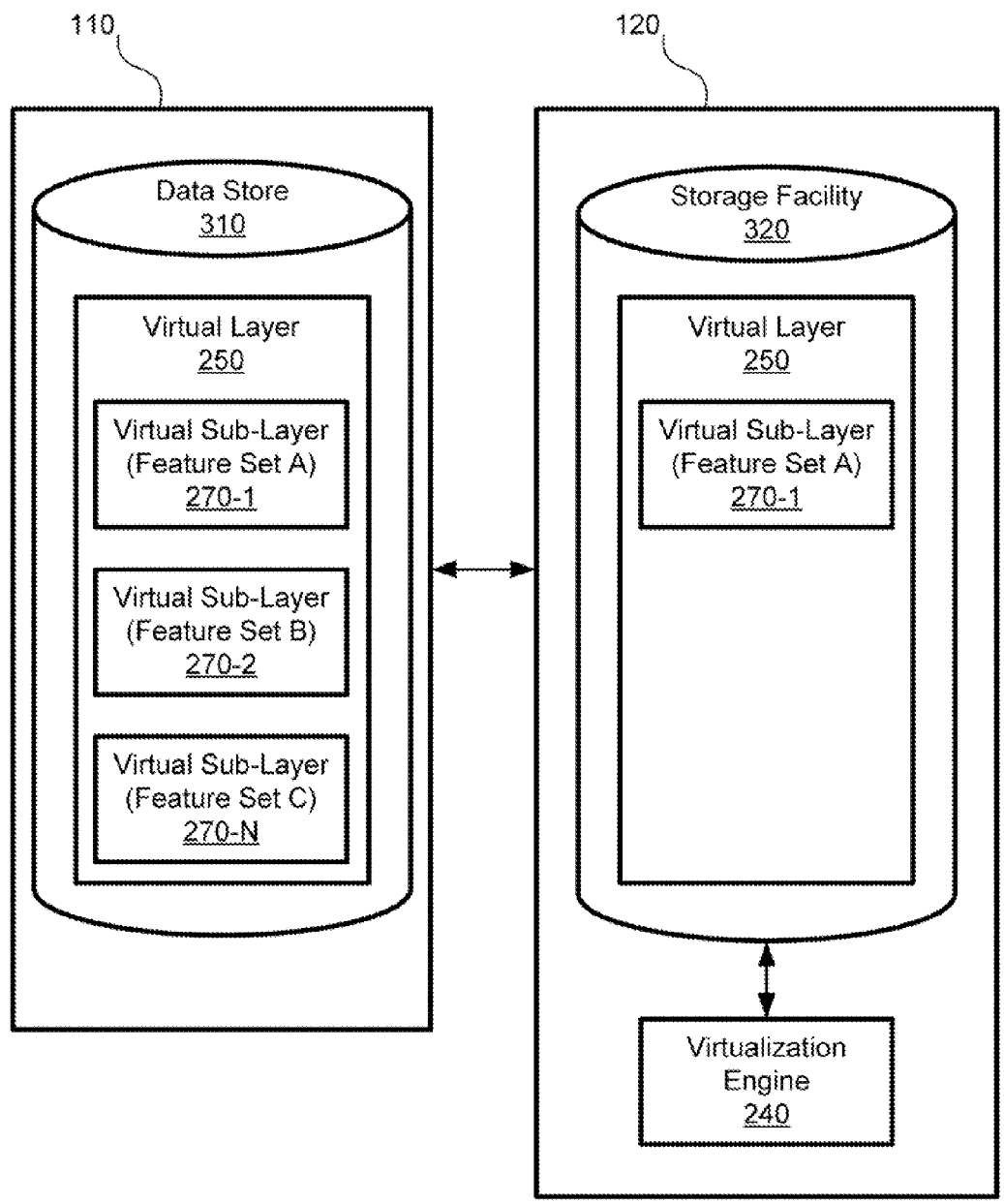
FIG. 3A illustrates another exemplary feature based configuration of virtually installed software.

As shown in FIG. 3A, the software management subsystem 110 may include virtual layer 250 and virtual sub-layers 270-1 through 270-N having feature sets A, B, and C, respectively. The virtual layer 250 and virtual sub-layers 270-1 through 270-N may be stored in a data store 310, which may include, but is in no way limited to, one or more electronic data storage mediums, devices, or configurations and may employ any type, form, and combination of well known storage media, including hard disk drives, read-only memory, Flash memory, caches, databases, optical media, and random access memory. Data store 310 may include any suitable technologies useful for storing, updating, searching, modifying, accessing, retrieving, and deleting electronic data. Data store 310 may include a library of virtual layers 250 and/or virtual sub-layers 270 that can be individually, selectively, securely, and efficiently delivered to one or more computing devices 120 for virtual installation.

Accordingly, a computing device 120 may receive and include various combinations of virtually installed feature sets. Computing device 120 may receive virtual layer 250 and/or one or more of the virtual sub-layers 270 from the software management subsystem 110 and virtual install the layers by storing them to a storage facility 320. Storage facility 320 may include, but is in no way limited to, one or more electronic data storage mediums, devices, or configurations and may employ any type, form, and combination of well known storage media, including hard disk drives, read-only memory, Flash memory, caches, databases, optical media, and random access memory. Storage facility 320 may include any suitable technologies useful for storing, updating, searching, modifying, accessing, retrieving, and deleting electronic data.

FIG. 3A illustrates an exemplary configuration in which virtual layer 250 and virtual sub-layer 270-1 have been delivered and virtually installed to computing device 120. Accordingly, feature set A is virtually installed to computing device 120 and may be activated by virtualization engine 240 enabling virtual sub-layer 270-1 as described above.

Figure 3B:
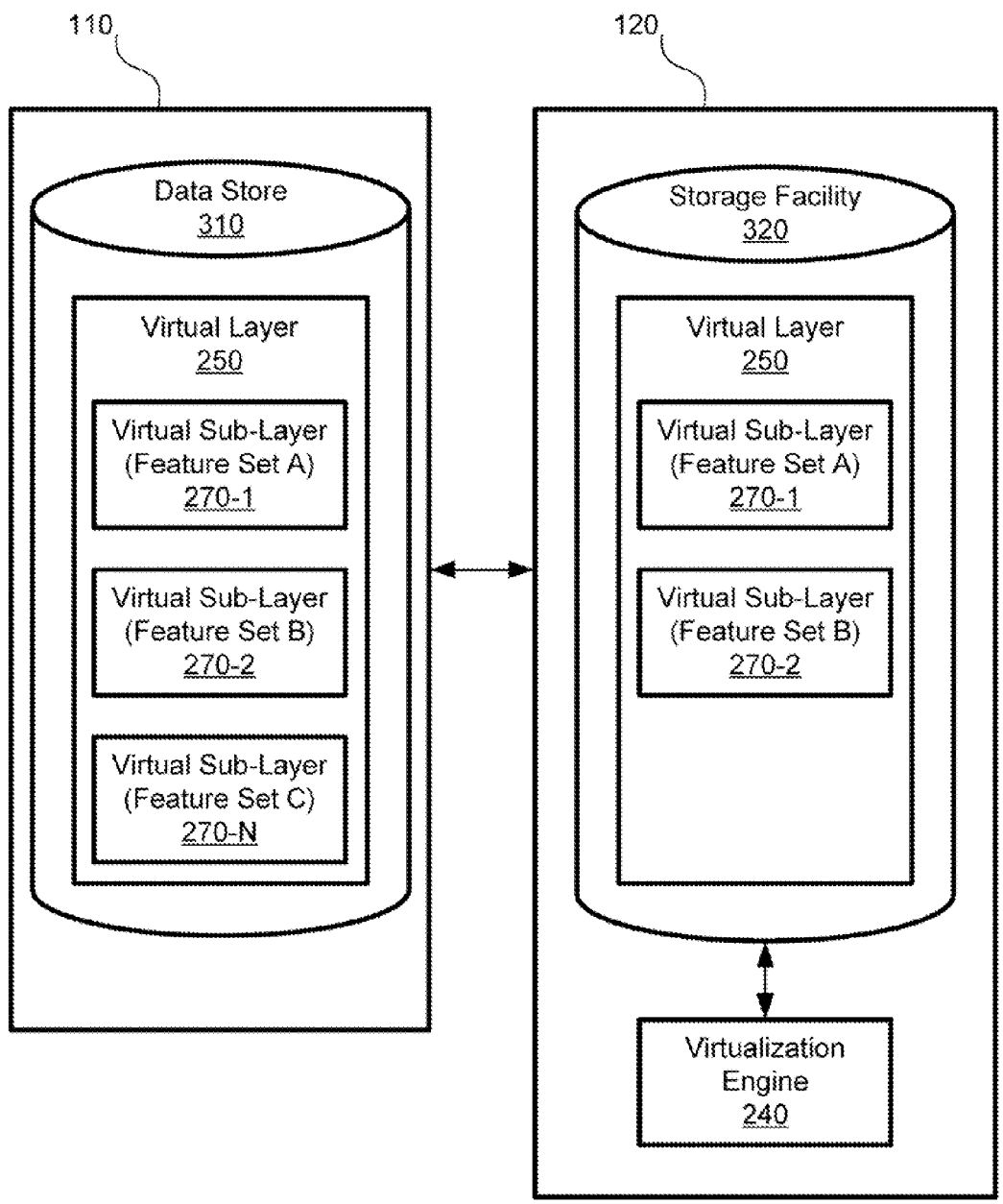
FIG. 3B illustrates another exemplary feature based configuration of virtually installed software.

FIG. 3B illustrates another exemplary configuration in which virtual layer 250, virtual sub-layer 270-1, and virtual sub-layer 270-2 have been delivered and virtually installed to computing device 120. Accordingly, feature sets A and B are virtually installed to computing device 120 and may be selectively and individually activated by virtualization engine 240 enabling virtual sub-layers 270-1 and 270-2 as described above.

Thus, various configurations of feature sets may be delivered and virtually installed to computing devices 120. In addition, a configuration of one or more feature sets virtually installed to a computing device 120 may be conveniently modified. As an example, a computing device 120 may have installed thereto virtual layer 250 and virtual sub-layer 270-1 as shown in FIG. 3A. A user of the computing device 120 may attempt to use a software feature not included in feature set A. The virtualization engine 240 may detect this attempt as described above. The virtualization engine 240 may further recognize that the requested feature is not virtually installed to the computing device 120. In response, the virtualization engine 240 may initiate sending a request for the feature from the computing device 120 to the software management subsystem 110. The software management subsystem 110 may receive the request, identify a virtual sub-layer 270-2 having the requested feature included therein, and delivery the virtual sub-layer 270-2 to the computing device 120. The virtualization engine 240 may virtually install the virtual sub-layer 270-2 to create the configuration shown in FIG. 3B. The virtualization engine 240 may activate the feature by enabling the virtual sub-layer 270-2 as described above.

As another example of modifying a configuration of virtually installed feature sets, a computing device 120 may have installed thereto virtual layer 250, virtual sub-layer 270-1, and virtual sub-layer 270-2 as shown in FIG. 3B. Nonuse of features in feature set B may be detected as described above. In response, the virtualization engine 240 may disable and/or remove (e.g. delete) virtual sub-layer 270-2 from the computing device 120. In certain embodiments, the virtualization engine 240 may initiate sending a notification of the removal to the software management subsystem 110. Accordingly, the software management subsystem 110 may update a record of deployed configurations, which may be used for billing purposes, as described further below.

Figure 4:
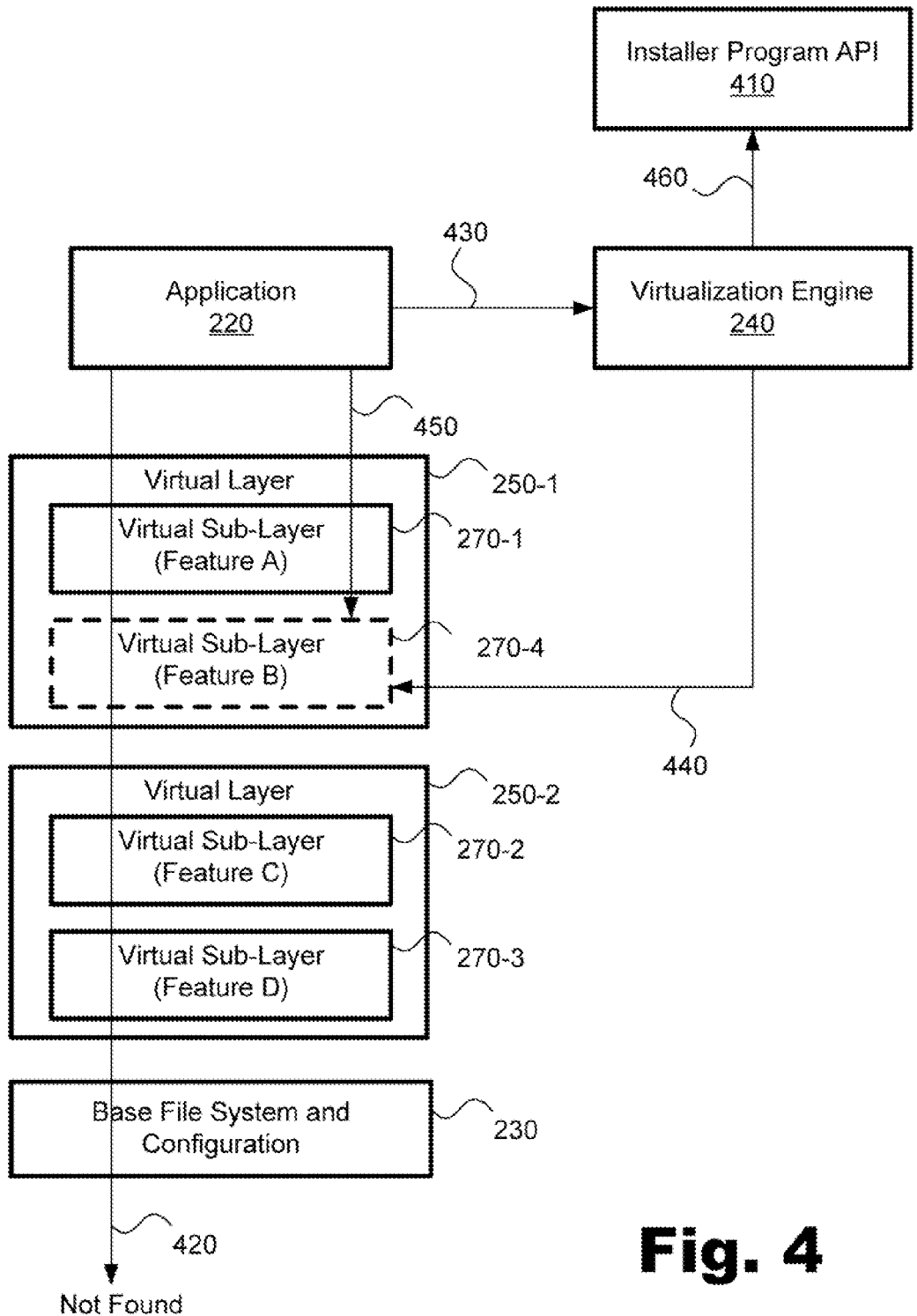
FIG. 4 illustrates yet another exemplary feature based configuration of virtually installed software.

Feature based virtualization of software packages may be configured to hook into a standard installer application program interface ("API"), such as a Windows Installer API, installed to a computing device 120. For example, if a software package originated from an installer program package, the virtualization engine 240 may hook into the installer program API for accessing features of the software package that are not virtually installed. To illustrate, FIG. 4 illustrates an exemplary software installation configuration as may be implemented and enabled on a computing device 120. As shown, the configuration may include virtual layer 250-1 having virtual sub-layer 270-1 associated with feature A, virtual layer 250-2 having virtual sub-layer 270-2 associated with Feature C and virtual sub-layer 270-3 associated with Feature D, an application 220 that is a component of virtual layer 250-1, base file system and configuration 230, virtualization engine 240, and an installer program API 410. Virtual sub-layer 270-4 is shown in broken lines to illustrate that it is not yet virtually installed and that feature B is not yet available to application 220.

Application 220 may attempt to use feature B. As represented by reference number 420, feature B is not found in any of the virtual layers 250-1 and 250-2, virtual sub-layers 270-1, 270-2, and 270-3, or the base file system and configuration 230. Accordingly, application 220 may send a request for feature B to the installer program API 410. The virtualization engine 240 may be hooked into the installer program API 410 such that the request may be intercepted and handled by virtualization engine 240, as represented by reference number 430 in FIG. 4. The virtualization engine 240 may virtually install and/or enable a virtual layer 270-4 associated with feature B in any of the ways described above, as represented by reference number 440 in FIG. 4. This may include enabling virtual sub-layer 270-4 or requesting and receiving virtual sub-layer 270-4 from the software management subsystem 110 and then enabling the received virtual sub-layer 270-4. With the virtual sub-layer 240-4 virtually installed and enabled, the application 220 may use feature B, as represented by reference number 450 in FIG. 4.

Alternately, the virtualization engine 240 may recognize the request from the application 220 as a request for a non-virtualized feature. In other words, feature B may not be available in virtualized form. In response, the virtualization engine 240 may pass the request from application 220 on to the installer program API, as represented by reference number 460 in FIG. 4. The installer program API may handle the request in any suitable or well known manner.

In any of the examples described above, the virtualization engine 240 may be configured to provide one or more graphical user interfaces ("GUIs"), such as a pop-up window, for presentation to a user. Such a GUI may provide the user with one or more tools for controlling software virtualization operations. As an example, a GUI may present a dialogue asking the user for permission to request and bring down (e.g., download), virtually install, enable, disable, and/or remove one or more virtual sub-layers 270. In certain embodiments, the software management subsystem 110 may be configured to provide similar GUIs and tools to a user of the software management subsystem 110 (e.g., an administrator of computing system 100).

The above-described principles may be used to support and/or enhance delivery and/or enablement of software as a service. For example, a first fee may be charged for delivery and/or enablement of a first virtual sub-layer 270-1 associated with a first feature set (e.g., feature set A), and a second fee may be charged for delivery and/or enablement of a second virtual sub-layer 270-2 associated with a second feature set (e.g., feature set B). Accordingly, fees for software may be charged at a feature set level.

Software fees may be based on actual usage of software feature sets. As described above, feature sets may be delivered, enabled, disabled, and/or removed based on use and/or nonuse of features. Because fees for feature sets may be charged for delivery, virtual installation, and/or enablement of feature sets, the fees may be based on actual usage of software feature sets.

Feature based billing for software as a service may help a user of a computing device 120 and/or an administrator or organization operating a computing system 100 to avoid, or at least reduce, fees associated with unused and/or unwanted computer programs and features. Instead of having to deploy and install monolithic software packages, components of virtualized software packages may be deployed, virtually installed, enabled, disabled, and removed at a feature set level such that a user, administrator, or organization pays fees only for software features that are actually used or wanted. Moreover, the number of computer programs and features installed across computing system 100 may be reduced, which may help conserve resources and/or reduce the chances of introducing conflicts between different computer programs and features installed across the computing system 100.

Figure 5:
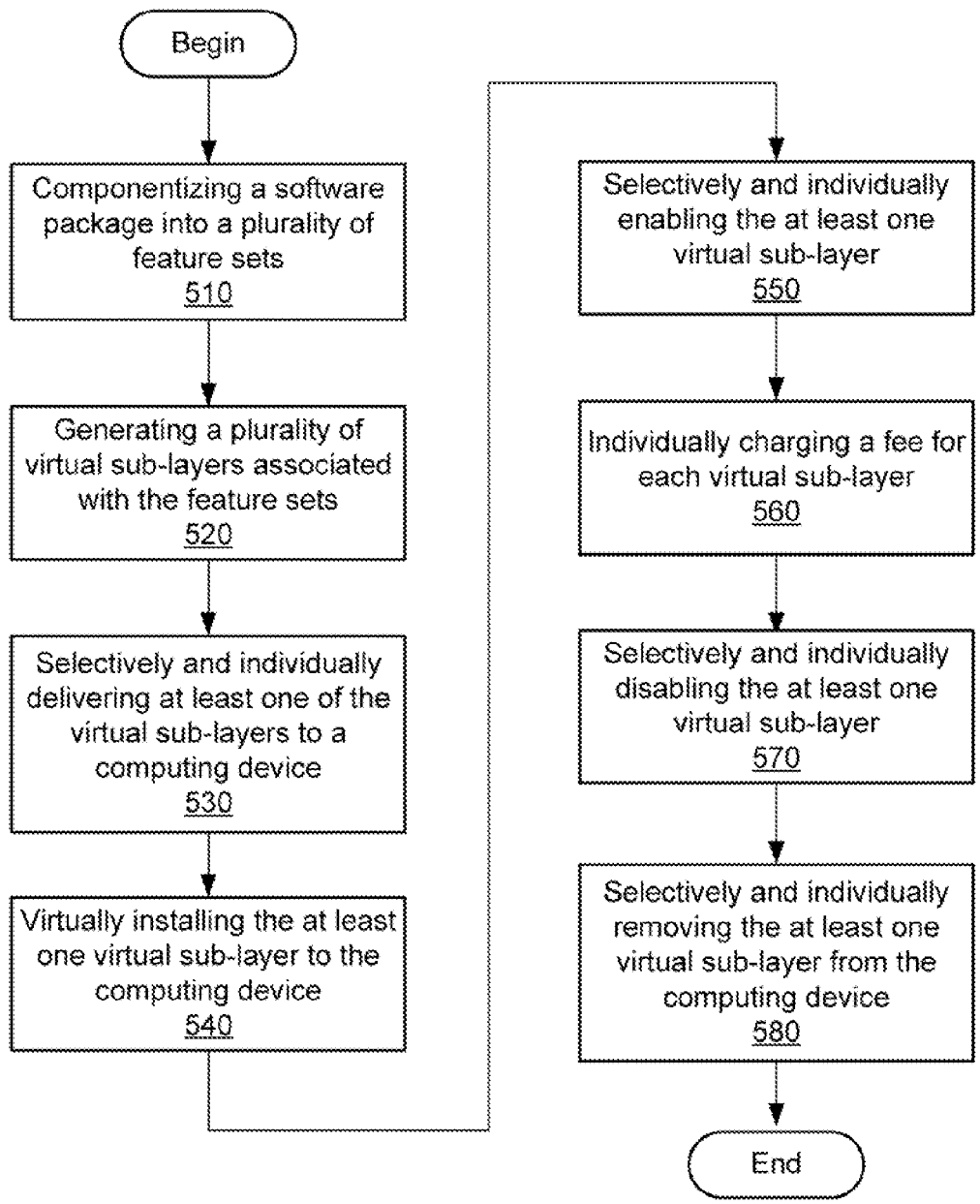
FIG. 5 illustrates an exemplary method of feature based software virtualization.

FIG. 5 illustrates an exemplary method of feature based software virtualization. While FIG. 5 illustrates exemplary steps according to one embodiment, other embodiments may omit, add to, reorder, and/or modify any of the steps shown in FIG. 5.

In step 510, a software package is componentized into a plurality of feature sets. Step 510 may be performed in any of the ways described above, including the software management subsystem 110 and/or virtualization engine 240 componentizing features of the software package into subsets of the features of the software package.

In step 520, a plurality of virtual sub-layers 270 associated with the feature sets is generated. Step 520 may be performed in any of the ways described above, including the software management subsystem 110 and/or the virtualization engine 240 generating the virtual sub-layers 270 to include feature set content (e.g., program and configuration files associated with the feature sets).

In step 530, at least one of the virtual sub-layers 270 is selectively and individually delivered to a computing device 110. Step 530 may be performed in any of the ways described above, including the software management subsystem 110 transmitting data representing the at least one virtual sub-layer 270 to the computing device 110 over network 130.

In step 540, the at least one virtual sub-layer 270 is virtually installed to the computing device 120. Step 540 may be performed in any of the ways described above, including the virtualization engine 240 storing data representing the at least one virtual sub-layer 270 to one or more memory locations in storage facility 320.

In step 550, at least one of the virtual sub-layers 270 is selectively and individually enabled. Step 550 may be performed in any of the ways described above, including applying mapping data associated with the at least one virtual sub-layer 270 to the virtualization engine 240.

In step 560, a fee is individually charged for each virtual sub-layer 270. Step 560 may be performed in any of the ways described above, including charging for delivery and/or enablement of each virtual sub-layer 270. In certain embodiments, the software management subsystem 110 may be configured to render the charges, which may include recording data for calculating charges, calculating the charges, and/or transmitting data representative of or otherwise related to the charges to an external entity (e.g., a customer).

In step 570, at least one of the virtual sub-layers 270 is selectively and individually disabled. Step 570 may be performed in any of the ways described above, including removing mapping data associated with the at least one virtual sub-layer 270 from the virtualization engine 240.

In step 580, at least one of the virtual sub-layers 270 is selectively and individually removed from the computing device 120. Step 580 may be performed in any of the ways described above, including the virtualization engine 240 deleting data representing the virtual sub-layers 270.

Any of the steps shown in FIG. 5 may be performed in response to a detection of a predefined trigger event. For example, as described above, a virtual sub-layer 270 may be delivered and/or enabled in response to detection of a request to use a software feature that is not enabled and/or virtually installed to the computing device 120. As also described above, a virtual sub-layer 270 may be disabled and/or removed in response to detection of nonuse of the feature set associated with the virtual sub-layer 270.

The preceding description has been presented only to illustrate and describe exemplary embodiments with reference to the accompanying drawings. It will, however, be evident that various modifications and changes may be made thereto, and additional embodiments may be implemented, without departing from the scope of the invention as set forth in the claims that follow. The above description and accompanying drawings are accordingly to be regarded in an illustrative rather than a restrictive sense.

What is claimed is:

1. A method, comprising:
   providing, on a computing device having a base file system and a base configuration of a base operating system, a virtualization system;
   virtually installing, to the computing device, a first feature set of a software application by installing the first feature set to a first virtual sub-layer without writing to the base file system and the base configuration, the first feature set including a first subset of features associated with the software application; and
   enabling the first virtual sub-layer to activate the first feature set such that access requests associated with the first feature set of the software application are redirected, by the virtualization system, from the base file system and/or the base configuration to the first virtual sub-layer;
   virtually installing, to the computing device, a second feature set of the software application by installing the second feature set to a second virtual sub-layer without writing to the base file system and the base configuration, the second feature set including a second subset of the features associated with the software application that are different than the first subset of features associated with the software application; and
   enabling the second virtual sub-layer to activate the second feature set such that access requests associated with the second feature set of the software application are redirected, by the virtualization system, from the base file system and/or the base configuration to the second virtual sub-layer.

2. The method of claim 1, further comprising detecting a request for one of the features of the software application not included in the first feature set, wherein the enabling of the second virtual sub-layer is performed in response to the detecting, the second feature set including the requested feature.

3. The method of claim 1, further comprising:
   detecting a request for one of the features of the software application not included in the first feature set; and
   requesting and receiving data representing the second virtual sub-layer associated with the second feature set, the second feature set including the requested feature;
   wherein the virtually installing and the enabling of the second virtual sub-layer is performed in response to the receiving of the data representing the second virtual sub-layer.

4. The method of claim 1, further comprising:
   charging a first fee for the first feature set; and
   charging a second fee for the second feature set.

5. The method of claim 4, wherein the charging of the first fee is based on at least one of the virtually installing and the enabling of the first virtual sub-layer, and the charging of the second fee is based on at least one of the virtually installing and the enabling of the second virtual sub-layer.

6. The method of claim 1, further comprising:
   detecting a nonuse of the second feature set; and
   disabling, in response to the nonuse, the second virtual sub-layer to deactivate the second feature set.

7. The method of claim 6, further comprising removing, in response to the nonuse, the second virtual sub-layer from the computing device.

8. The method of claim 1, further comprising capturing the software application, including:
   componentizing the software application into a plurality of components corresponding with a plurality of feature sets, said plurality of feature sets including the first feature set and at least the second feature set, the second feature set being associated with a second subset of features of the software application;
   generating the first virtual sub-layer to include first feature set content; and
   generating the second virtual sub-layer to include second feature set content.

9. The method of claim 8, further comprising selectively and individually delivering the first virtual sub-layer and the second virtual sub-layer to the computing device.

10. The method of claim 1, further comprising:
    intercepting a request for one of the features of the software application not included in the first feature set; and
    passing the request to an installer program application program interface.

11. A computer program product embodied in a non-transitory computer readable medium and comprising computer instructions executable by a computing device to perform the functions of:
    virtually installing, to the computing device, a first feature set of a software application by installing the first feature set to a first virtual sub-layer without writing to a base file system and a base configuration, the first feature set including a first subset of features associated with the software application;
    virtually installing, to the computing device, a second feature set of the software application by installing the second feature set to a second virtual sub-layer without writing to the base file system and the base configuration, the second feature set including a second subset of the features associated with the software application that are different than the first subset of the features associated with the software application; and
    selectively and individually enabling at least one of the first virtual sub-layer to activate the first feature set and the second virtual sub-layer to active the second feature set such that access requests associated with the first feature set of the software application are redirected from the base file system and/or the base configuration to the first virtual sub-layer, and access requests associated with the second feature set of the software application are redirected from the base filed system and/or the base configuration to the second virtual sub-layer.

12. The computer program product of claim 11, further comprising computer instructions executable by the computing device to perform the function of selectively and individually disabling at least one of the first virtual sub-layer to deactivate the first feature set and the second virtual sub-layer to deactivate the second feature set.

13. The computer program product of claim 11, further comprising computer instructions executable by the computing device to perform the functions of:
    detecting nonuse of at least one of the first virtual sub-layer and the second virtual sub-layer; and disabling the at least one of the first virtual sub-layer and the second virtual sub-layer in response to the nonuse.

14. The computer program product of claim 11, further comprising computer instructions executable by the computing device to perform the functions of:
   detecting a request for a feature of the software application not included in the first virtual sub-layer or the second virtual sub-layer;
   initiating sending the request for the requested feature;
   receiving a third virtual sub-layer associated with a third feature set of the software application, the third feature set including the requested feature;
   virtually installing the third virtual sub-layer; and
   enabling the third virtual sub-layer.

15. A system, comprising:
   a software management subsystem configured to maintain a plurality of virtual sub-layers associated with a plurality of feature sets, each of the features sets including a subset of features of a software application; and
   at least one computing device communicatively coupled to the software management subsystem, the computing device having a base file system and a base configuration of a base operating system;
   wherein the software management subsystem is configured to selectively and individually deliver at least two of the virtual sub-layers to the computing device; and
   wherein the computing device is configured to receive and virtually install the at least two of the virtual sub-layers without writing to the base file system and the base configuration;
   selectively and individually enabling the at least two of the virtual sub-layers at the computing device to activate the feature sets associated with the two virtual sub-layers such that access requests associated with each of the two feature sets associated with the two installed virtual sub-layers of the software application are redirected from the base file system and/or the base configuration to the respective virtual sub-layer.

16. The system of claim 15, wherein the computing device is configured to selectively and individually disable the at least one of the virtual sub-layers.

17. The system of claim 16, wherein the software management subsystem is configured to individually charge for the enablement of the at least one of the virtual sub-layers.

18. The system of claim 15, wherein the software management subsystem is configured to individually charge for the delivery of the at least one of the virtual sub-layers.

19. The system of claim 15, wherein the software management subsystem is configured to:
   componentize the software application into the plurality of feature sets; and
   generate the plurality of virtual sub-layers to include content associated with the plurality of feature sets.

* * * * *